(12) United States Patent
Abts et al.

(10) Patent No.: US 11,645,226 B1
(45) Date of Patent: May 9, 2023

(54) COMPILER OPERATIONS FOR TENSOR STREAMING PROCESSOR

(71) Applicant: Groq, Inc., Mountain View, CA (US)

(72) Inventors: Dennis Charles Abts, Eau Claire, WI (US); Jonathan Alexander Ross, Palo Alto, CA (US); John Thompson, Minneapolis, MN (US); Gregory Michael Thorson, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 0 days.

(21) Appl. No.: 17/697,201

(22) Filed: Mar. 17, 2022

Related U.S. Application Data

(63) Continuation of application No. 17/105,976, filed on Nov. 27, 2020, now Pat. No. 11,360,934, which is a continuation-in-part of application No. 17/103,910, filed on Nov. 24, 2020, now abandoned, and a continuation-in-part of application No. 16/951,938, filed on Nov. 18, 2020, said application No. 17/105,976 is a continuation-in-part of application No. 16/526,966, filed on Jul. 30, 2019, now Pat. No. 11,263,129, which is a continuation of application (Continued)

(51) Int. Cl.
*G06F 15/82* (2006.01)
*G06N 20/00* (2019.01)

(52) U.S. Cl.
CPC .......... *G06F 15/825* (2013.01); *G06N 20/00* (2019.01)

(58) Field of Classification Search
None
See application file for complete search history.

(56) References Cited

U.S. PATENT DOCUMENTS 5,058,001 A 10/1991 Li
5,333,279 A 7/1994 Dunning
(Continued)

OTHER PUBLICATIONS

Sotiropoulos, A. et al., Enhancing the Performance of Tiled Loop Execution on to Clusters using Memory Mapped Network Interfaces and Pipelined Schedules, 2002,,ipdps, new.cslab.ntua.gr., 9 pages. (Year: 2002).*

(Continued)

*Primary Examiner* — Eric Coleman
(74) *Attorney, Agent, or Firm* — Fenwick & West LLP

(57) ABSTRACT

Embodiments are directed to a processor having a functional slice architecture. The processor is divided into tiles (or functional units) organized into a plurality of functional slices. The functional slices are configured to perform specific operations within the processor, which includes memory slices for storing operand data and arithmetic logic slices for performing operations on received operand data (e.g., vector processing, matrix manipulation). The processor includes a plurality of functional slices of a module type, each functional slice having a plurality of tiles. The processor further includes a plurality of data transport lanes for transporting data in a direction indicated in a corresponding instruction. The processor also includes a plurality of instruction queues, each instruction queue associated with a corresponding functional slice of the plurality of functional slices, wherein the instructions in the instruction queues comprise a functional slice specific operation code.

20 Claims, 13 Drawing Sheets

Related U.S. Application Data

No. 16/132,243, filed on Sep. 14, 2018, now Pat. No. 11,243,880.

(60) Provisional application No. 63/114,500, filed on Nov. 16, 2020, provisional application No. 62/940,815, filed on Nov. 26, 2019, provisional application No. 62/937,123, filed on Nov. 18, 2019, provisional application No. 62/559,333, filed on Sep. 15, 2017.

(56) References Cited

U.S. PATENT DOCUMENTS

| | | | |
|---|---|---|---|
| 5,488,729 | A | 1/1996 | Vegesna et al. |
| 5,590,083 | A | 12/1996 | Pinkham et al. |
| 5,594,915 | A | 1/1997 | Atalla |
| 5,794,062 | A | 8/1998 | Baxter |
| 5,842,034 | A | 11/1998 | Bolstad et al. |
| 6,298,162 | B1 | 10/2001 | Sutha et al. |
| 7,181,484 | B2 | 2/2007 | Stribaek et al. |
| 7,236,995 | B2 | 6/2007 | Hinds |
| 8,250,555 | B1 | 8/2012 | Lee et al. |
| 8,407,167 | B1 | 3/2013 | Abts et al. |
| 8,583,895 | B2 | 11/2013 | Jacobs et al. |
| 8,655,937 | B1 | 2/2014 | Vanderspek |
| 9,146,747 | B2 | 9/2015 | Moloney et al. |
| 9,432,298 | B1 | 8/2016 | Smith |
| 9,672,188 | B2 | 6/2017 | Vorbach |
| 9,691,019 | B1 | 6/2017 | Gulland et al. |
| 9,697,463 | B2 | 7/2017 | Ross et al. |
| 9,710,265 | B1 | 7/2017 | Temam et al. |
| 9,710,748 | B2 | 7/2017 | Ross et al. |
| 9,723,317 | B2 | 8/2017 | Hattori |
| 10,167,800 | B1 | 1/2019 | Chung et al. |
| 10,175,980 | B2 | 1/2019 | Temam et al. |
| 10,521,488 | B1 | 12/2019 | Ross et al. |
| 11,086,623 | B2 | 8/2021 | Valentine et al. |
| 2004/0078555 | A1 | 4/2004 | Porten et al. |
| 2005/0278505 | A1 | 12/2005 | Lim et al. |
| 2006/0190519 | A1 | 8/2006 | Stribaek et al. |
| 2007/0124732 | A1* | 5/2007 | Lia .................. G06F 9/4881 718/102 |
| 2008/0126761 | A1* | 5/2008 | Fontenot .......... G06F 9/4881 712/E9.034 |
| 2011/0273459 | A1 | 11/2011 | Letellier et al. |
| 2012/0072699 | A1 | 3/2012 | Vorbach et al. |
| 2012/0159507 | A1* | 6/2012 | Kwon .............. G06F 9/5088 718/104 |
| 2012/0303933 | A1 | 11/2012 | Manet et al. |
| 2012/0317065 | A1 | 12/2012 | Bernstein et al. |
| 2013/0070588 | A1 | 3/2013 | Steele et al. |
| 2014/0047211 | A1 | 2/2014 | Fleischer et al. |
| 2014/0115301 | A1 | 4/2014 | Sanghai et al. |
| 2016/0342892 | A1 | 11/2016 | Ross |
| 2016/0371093 | A1* | 12/2016 | Chang ............... G06F 9/3887 |
| 2017/0103316 | A1 | 4/2017 | Ross et al. |
| 2017/0139677 | A1 | 5/2017 | Lutz et al. |
| 2017/0177352 | A1 | 6/2017 | Ould-Ahmed-Vall |
| 2017/0220719 | A1 | 8/2017 | Elrabaa et al. |
| 2017/0347109 | A1 | 11/2017 | Hendry et al. |
| 2018/0046903 | A1 | 2/2018 | Yao et al. |
| 2018/0046907 | A1 | 2/2018 | Ross et al. |
| 2018/0075338 | A1 | 3/2018 | Gokmen |
| 2018/0121796 | A1 | 5/2018 | Deisher et al. |
| 2018/0247190 | A1 | 8/2018 | Chung et al. |
| 2018/0314671 | A1 | 11/2018 | Zhang et al. |
| 2018/0315157 | A1 | 11/2018 | Ould-Ahmed-Vall et al. |
| 2018/0329479 | A1 | 11/2018 | Meixner |
| 2019/0303147 | A1 | 10/2019 | Brewer |
| 2019/0311243 | A1 | 10/2019 | Whatmough et al. |
| 2019/0370645 | A1 | 12/2019 | Lee et al. |
| 2020/0192701 | A1 | 6/2020 | Horowitz et al. |
| 2020/0285605 | A1 | 9/2020 | Nam |

OTHER PUBLICATIONS

Sotiropoulos, A. et al., Enhancing the Performance of Tiled Loop Execution on to Clusters using Memory Mapped Network Interfaces and Pipelined Schedules, 2002, citation 1 page. (Year: 2002).*

Abts, D. et al., "Think Fast: A Tensor Streaming Processor (TSP) for Accelerating Deep Learning Workloads," 2020 ACM/IEEE 47th Annual International Symposium on Computer Architecture, May 2020, pp. 145-158.

Chang, W, "Computer Organization," CSC137. Sacramento State University, Spring Semester 2020, pp. 1-37.

De, A. et al., "Fast Integer Multiplication Using Modular Arithmetic," SIAM Journal on Computing, vol. 42, No. 2, Apr. 18, 2013, pp. 1-18.

Groq, "Groq Announces World's First Architecture Capable of 1,000,000,000,000,000 Operations per Second on a Single Chip," Nov. 14, 2019, three pages, [Online] [Retrieved on Jan. 12, 2021] Retrieved from the Internet <URL: https://www.prnewswire.com/news-releases/groq-announces-worlds-firstarchitecture-capable-of-1-000-000-000-000-000-operations-per-second-on-a-single-chip-300958743.htm l>.

Groq, Inc. "The Challenge of Batch Size 1: Groq Adds Responsiveness to Inference Performance" White Paper, Apr. 2020, pp. 1-7.

Hai Dar, A. et al., "Harnessing GPU Tensor Cores for Fast FP16 Arithmetic to Speed up Mixed-Precision Iterative Refinement Solvers," SC18, Nov. 11-16, 2018, pp. 1-11.

Hu, Y. et al., "On-chip Instruction Generation for Cross-Layer CNN Accelerator on FPGA," 2019 IEEE Computer Dociety Annual Symposium on VLSI (ISVLSI), Jul. 2019, pp. 7-12.

Johnson, J., "Making floating point math highly efficient for AI hardware," Nov. 8, 2018, nine pages, [Online] [Retrieved on Jan. 20, 2021] Retrieved from the Internet <URL: https://engineering.fb.com/2018/11/08/ai-research/floating-point-math/>.

Jouppi, N.P. et al., "In-Datacenter Performance Analysis of a Tensor Processing Unit," ISCA '17, Jun. 2017, pp. 1-12.

Lopes, A.R. et al., "A Fused Hybrid Floating-Point and Fixed-Point Dot-product for FPGAs," International Symposium on Applied Reconfigurable Computing, Mar. 2010, pp. 157-168.

PCT International Search Report and Written Opinion, PCT Application No. PCT/US20/62241, Feb. 11, 2021, 20 pages.

Southard, D. "Tensor Streaming Architecture Delivers Unmatched Performance for Compute-Intensive Workloads" Groq White Paper, Nov. 18, 2019, pp. 1-7.

United States Office Action, U.S. Appl. No. 17/104,465, dated Nov. 12, 2021, 18 pages.

United States Office Action, U.S. Appl. No. 16/951,938, dated Aug. 17, 2021, 12 pages.

United States Office Action, U.S. Appl. No. 16/132,243, dated Aug. 10, 2020, 20 pages.

United States Office Action, U.S. Appl. No. 16/132,243, dated Dec. 31, 2019, 15 pages.

Wang, X. et al., "HERA: A Reconfigurable and Mixed-Mode Parallel Computing Engine on Platform FPGAS," Jan. 2004, pp. 1-6.

Wikipedia, "Complex instruction set computer," Last edited Dec. 27, 2020, pp. 1-5, [Online] [Retrieved Jan. 20, 2021] Retrieved from the Internet <URL: https://en.wikipedia.org/wiki/Complex instruction set computer>.

Wikipedia, "Harvard architecture," Last edited Mar. 4, 2020, pp. 1-4, [Online] [Retrieved Jan. 20, 2021] Retrieved from the Internet <URL: https://en.wikipedia.org/wiki/Harvard architecture>.

Wikipedia, "Instruction pipelining," Last edited Jan. 14, 2021, pp. 1-8, [Online] [Retrieved Jan. 8, 2021] Retrieved from the Internet <URL: https://en.wikipedia.org/wiki/Instruction pipelining>.

Wikipedia, "Parallel computing," Last edited Jan. 16, 2021, pp. 1-12, [Online] [Retrieved Jan. 22, 20211 Retrieved from the Internet <URL: https://en.wikipedia.ora/wiki/Parallel_computing>.

Wikipedia, "Reduced instruction set computer," Last edited Jan. 14, 2021, pp. 1-10, [Online] [Retrieved Jan. 20, 2021] Retrieved from the Internet <URL: https://en.wikipedia.ora/wiki/Reduced_instruction_set_computer>.

Wikipedia, "SIMD," Last edited Dec. 18, 2020, pp. 1-9, [Online] [Retrieved Jan. 22, 2021] Retrieved from the Internet <URL: https://en.wikipedia.orQ/wiki/SIMD>.

(56) References Cited

OTHER PUBLICATIONS

Wikipedia, "Tensor," Last edited Jan. 10, 2021, pp. 1-20, [Online] [Retrieved Jan. 15, 2021] Retrieved from the Internet <URL: https://en.wikipedia.ora/wiki/Tensor>.

Indian Patent Office, Office Action, Indian Patent Application No. 202247031762, dated Sep. 20, 2022, 6 pages.

United States Office Action, U.S. Appl. No. 17/105,976, dated Sep. 30, 2021, 18 pages.

Lethin, R.A. "How VLIW Almost Disappeared and Then Proliferated," *IEEE Solid-State Circuits Magazine*, vol. 1, No. 3, Aug. 7, 2009, pp. 15-23.

Mercaldi, M. et al. "Instruction Scheduling for a Tiled Dataflow Architecture," *ACM SIGARCH Computer Architecture News*, vol. 34, No. 5, Oct. 20, 2006, pp. 141-150.

United States Office Action, U.S. Appl. No. 17/684,337, dated Feb. 14, 2023, 14 pages.

\* cited by examiner

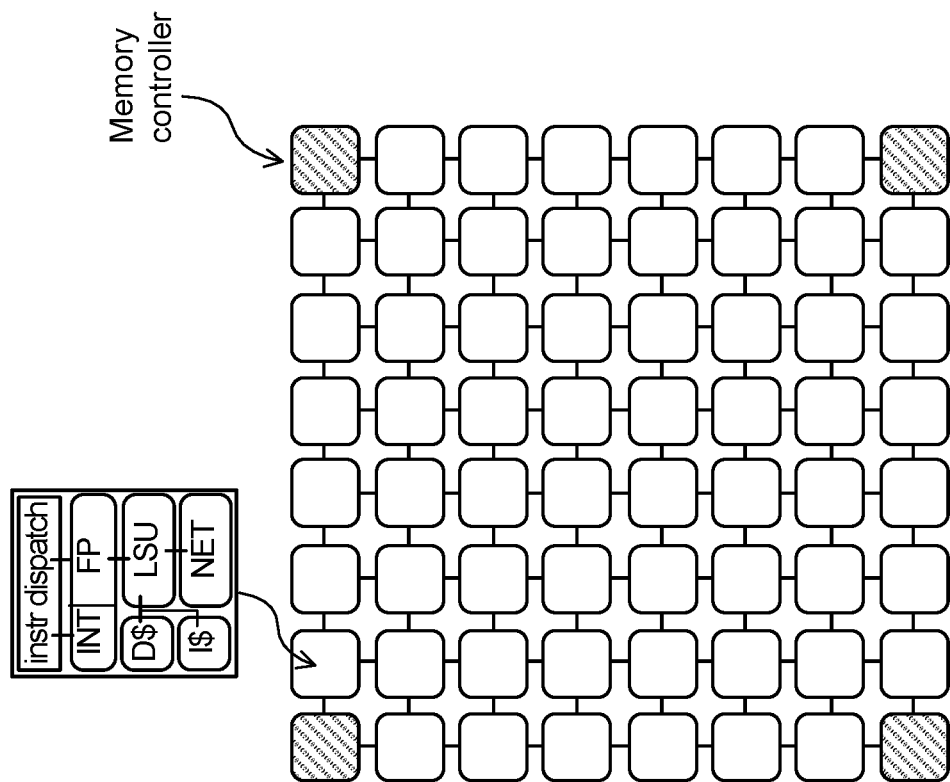

900

Allocate, by a compiler operating on a computer, resources of a processor across an area of the processor for corresponding operations to be performed at a plurality of defined time instants during operation of the processor
910

Schedule, by the compiler, each instruction flow of a plurality of instruction flows and one or more corresponding data flows to intersect at a specific resource of the allocated resources at a defined time instant of the plurality of defined time instants
920

FIG. 9

COMPILER OPERATIONS FOR TENSOR STREAMING PROCESSOR

CROSS-REFERENCE TO RELATED APPLICATIONS

This application is a continuation of co-pending U.S. patent application Ser. No. 17/105,976 filed Nov. 27, 2020, which claims priority under 35 U.S.C. § 119(e) to U.S. Provisional Patent Application Ser. No. 62/940,815, filed on Nov. 26, 2019. U.S. patent application Ser. No. 17/105,976 is a continuation-in-part of U.S. application Ser. No. 16/526,966, filed on Jul. 30, 2019, now U.S. Pat. No. 11,263,129, issued on Mar. 1, 2022, which is a continuation of U.S. application Ser. No. 16/132,243, filed on Sep. 14, 2018, now U.S. Pat. No. 11,243,880, issued on Feb. 8, 2022, which claims priority to U.S. Provisional Patent Application Ser. No. 62/559,333, filed on Sep. 15, 2017. U.S. patent application Ser. No. 17/105,976 is a continuation-in-part of co-pending U.S. application Ser. No. 16/951,938, filed on Nov. 18, 2020, which claims priority to U.S. Provisional Patent Application Ser. No. 62/937,123, filed on Nov. 18, 2019. U.S. patent application Ser. No. 17/105,976 is a continuation-in-part of co-pending U.S. application Ser. No. 17/103,910 filed on Nov. 24, 2020, which claims priority to U.S. Provisional Patent Application Ser. No. 63/114,500, filed on Nov. 16, 2020, which are incorporated herein by reference in their entireties for all purposes.

TECHNICAL FIELD

The present disclosure generally relates to a processor architecture, and more specifically to a tensor streaming processor architecture.

BACKGROUND

The world is increasingly turning to computationally intensive deep learning algorithms to solve important problems in science, transportation, security, and beyond. These workloads continue to grow both in size and complexity, presenting serious scalability, performance, and usability challenges for traditional central processing unit (CPU) and graphics processor unit (GPU) architectures. Unfortunately, hardware complexity of many microarchitectures makes it difficult to reason about runtime stalls. Furthermore, while microarchitectural enhancements such as caches, branch predictors, and prefetchers help tremendously in improving performance, they do not bound worst-case performance.

By way of example, figure (FIG.) 1A illustrates one example of a many-core processor architecture. As illustrated, each processor core architecture is a processing element tied together using a network-on-chip (NoC). For example, each core can include an integer (INT) and floating-point (FP) unit as well as load-store unit (LSU) to interface with the memory hierarchy (D$ and I$) and a network (NET) interface for communication with other cores of the architecture. Unfortunately, the multi-core architecture is inadequate to handle modern workloads.

SUMMARY

Embodiments of the present disclosure are directed to a processor having a functional slice architecture. In some embodiments, the processor is configured to process a machine learning model. The processor is divided into a plurality of functional units ("tiles") organized into a plurality of functional slices. Each functional slice is configured to perform specific functions within the processor, which may include memory slices (MEM) for storing operand data, arithmetic logic slices for performing operations on received operand data (e.g., vector processing, matrix manipulation), and/or the like. The tiles of the processor are configured to stream operand data across a first (e.g., temporal) dimension in a direction indicated in a corresponding instruction, and receive instructions across a second (e.g., spatial) dimension. The compiler for the processor is aware of the hardware configuration of the processor, and configures the timing of data and instruction flows such that corresponding data and instructions are intersected at each tile at a predetermined time.

In accordance with some embodiments of the present disclosure, the processor includes a plurality of functional slices of a module type, each functional slice having a plurality of tiles. The processor further includes a plurality of data transport lanes for transporting data in a direction indicated in a corresponding instruction. Each of the plurality of data transport lanes positioned along a first spatial dimension. In some instances, the data transport lanes may be referred to individually as a 'lane' or collectively as 'lanes'. The processor also includes a plurality of instruction queues, each instruction queue associated with a corresponding functional slice of the plurality of functional slices, wherein the instructions in the instruction queues comprise a functional slice specific operation code.

Some embodiments of the present disclosure are directed to a system comprising a processor (e.g., a tensor streaming processor or an artificial intelligence processor), at least one computer processor (e.g., a host server), and a non-transitory computer-readable storage medium having stored thereon computer executable instructions. The instructions when executed by a compiler operating on the at least one computer processor cause the at least one computer processor to be operable for allocating resources of the processor across an area of the processor for corresponding operations to be performed at a plurality of defined time instants during operation of the processor, and scheduling each instruction flow of a plurality of instruction flows and one or more corresponding data flows to intersect at a specific resource of the allocated resources at a defined time instant of the plurality of defined time instants.

BRIEF DESCRIPTION OF THE DRAWINGS

FIG. 1A illustrates a diagram of an example many-core tiled processor microarchitecture.

FIG. 9 is a flowchart illustrating a method of operating the processor, in accordance with some embodiments.

Figure 1B:
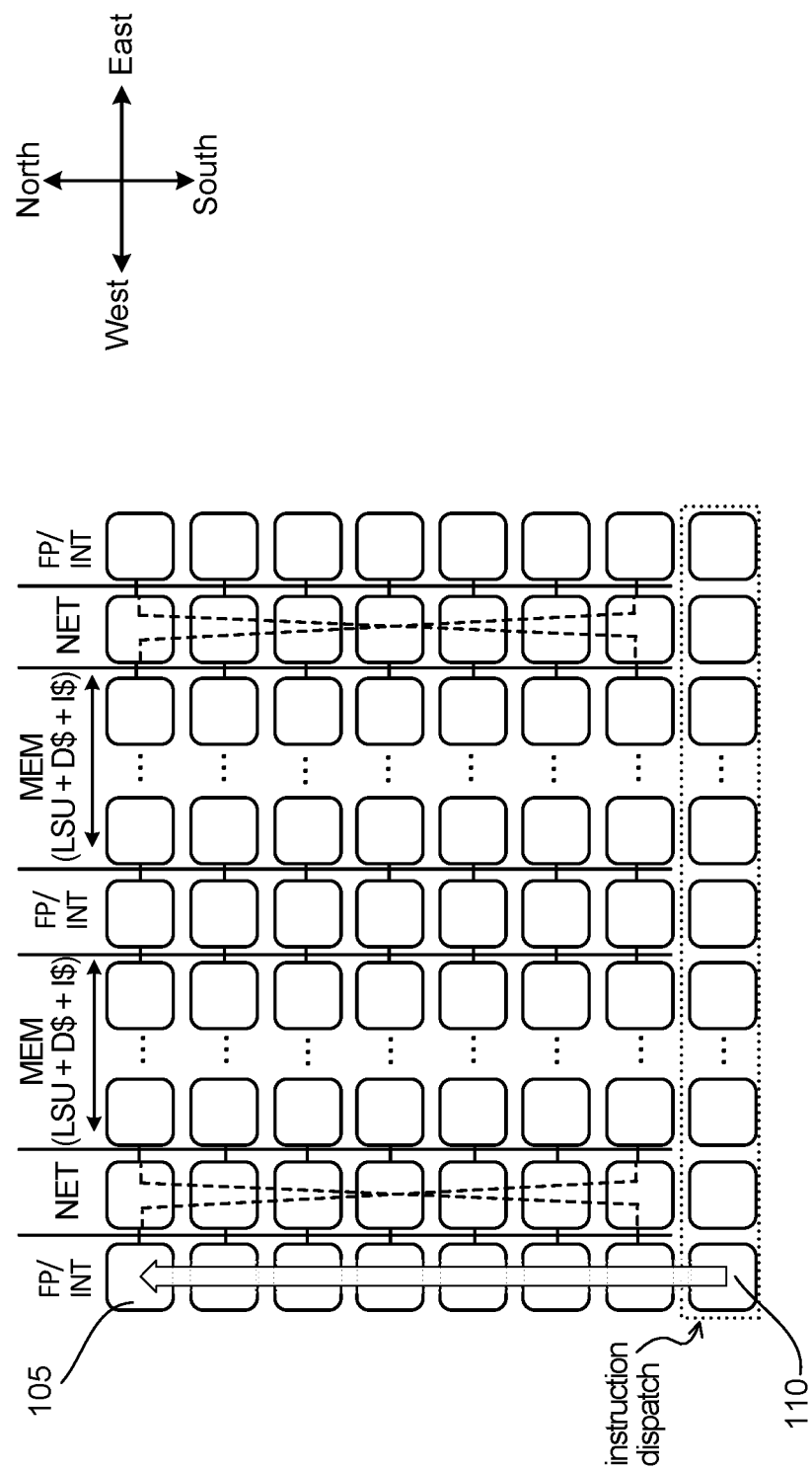
FIG. 1B illustrates a processor having a functional slice architecture, in accordance with some embodiments.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments are directed to a processor having a functional slicing architecture. In some embodiments, the processor may comprise a tensor streaming processor (TSP) having a functional slicing architecture, which may be used for hardware-accelerated machine learning (ML) applications.

The processor comprises a plurality of "tiles," each tile corresponding to a functional unit within the processor. The on-chip memory and network-on-chip (NoC) of the processor architecture are fused to provide both storage of operands and results, and may act as a conduit for transferring operand and/or result data to/from the functional units of the processor. The tiles of the processor are divided between different functionalities (e.g., memory, arithmetic operation, etc.), and are organized as functional slices which operate on multidimensional data (e.g., tensors). For example, each functional slice is composed from tiles which are abutted, both horizontal and vertically, to form the functional slice. The number of tiles and computation granularity of each tile may be selected to take advantage of the underlying technology on which it is built. Taken together, the number of tiles (N) and the word granularity (M) of a memory (e.g., static random-access memory (SRAM)) yields the vector length (VL) of the machine.

In some embodiments, each functional slice of the processor functions independently, and receives instructions from an instruction control unit (ICU). The ICU may pass instructions to a first tile of the functional slice, which are then propagated in a first temporal dimension of the processor along the functional slice to the remaining tiles of the functional slice. On the other hand, data operands for storage and/or processing may be passed between different functional slices of the processor, in a second spatial dimension of the processor perpendicular to the first temporal dimension. As such, the data flow and the instruction flow of the processor are separated from each other.

In some embodiments, a compiler for the processor is aware of the hardware configuration of the processor, and synchronizes the timing of data and instruction flows such that corresponding data and instructions are received at each tile with a predetermined temporal relationship (e.g., during the same clock cycle, separated by a predetermined delay, etc.). In some embodiments, the predetermined temporal relationship may be based upon the hardware of the processor, a type of instruction, and/or the like. Because the temporal relationship between data and instructions are known by the compiler, the operand data received by a tile does not include any metadata indicating what the data is to be used for. Instead, each tile receives instructions, and based upon the predetermined timing, performs the instruction on the corresponding data. This allows for the data and instructions to flow through the processor more efficiently.

Architectural Overview

FIG. 1B illustrates a processor 100 having a functional slice architecture, in accordance with some embodiments. In one embodiment, the processor 100 may be instantiated (e.g., be located within) an application specific integrated circuit (ASIC). The example illustration in FIG. 1B may represent a layout of the ASIC. In some embodiments, the processor 100 may be a co-processor that is designed to execute instructions for a predictive model. The predictive model is any model that is configured to make a prediction from input data. The predictive model can use a classifier to make a classification prediction. In one specific embodiment, the predictive model is a ML model such as a tensor flow model, and the processor 100 is a tensor streaming processor (TSP). In one or more embodiments, the processor 100 is an artificial intelligence (AI) processor that can perform very large numbers of computations in parallel using arrays of memory (MEM) and other computational resources (e.g., arrays of arithmetic functional units).

In comparison to the processor illustrated in FIG. 1A, the processor 100 in FIG. 1B employs a different microarchitecture that disaggregates the processing functional units into tiles. Tiles of the processor 100 are aggregated into a plurality of functional process units, herein referred to as 'functional slices' 105. Each functional slice 105 corresponds to a particular processing function type (e.g., ALU, MUL, FP/INT, MEM, etc.). For example, each functional slice 105 corresponds to a column of tiles. Each functional slice can be configured to perform specific functions within the processor 100. For example, functional slices include memory (MEM) slices for storing operand data, arithmetic logic slices for performing operations on received operand data (e.g., vector processing, matrix manipulation), and/or the like. In addition, the processor 100 also includes communication lanes (e.g., data transport lanes or pathways) to carry (or transport) data between the tiles of different functional slices in an east-west (e.g., horizontal) direction. Data transport lanes transport data in a direction indicated in a corresponding instruction. Each data transport lane is connected to each of the functional slices 105 of the processor 100.

The functional slices 105 of the processor 100 can each correspond to a different function. The functional slices 105 can also include arithmetic logic slices (e.g., FP/INT), lane switching slices (e.g., NET), and memory slices (e.g., MEM). The functional slices 105 of the processor 100 are differentiated per their respective functions. The arithmetic logic slices execute one or more arithmetic and/or logic operations on the data received via the data transport lanes to generate output data. Examples of arithmetic logic slices (or units) are matrix multiplication units and vector multiplication units.

The MEM slices include memory cells that store data that is transferred to the data transport lane in accordance with instructions that control the operation of the MEM slices. The MEM slices provide the data to other functional slices through the data transport lanes. The MEM slices also receive data from other functional slices through the data transport lanes. The MEM slices operate as functional process units that either store data (e.g., generated by arithmetic logic slices) or provide data to specific functional process units at a corresponding time (e.g., as scheduled by the compiler).

The lane switching slices may be configured to route data from one data transport lane to any other data transport lane. For example, data from a first lane may be provided to a second lane through a lane switching slice. In some embodiments, the lane switching slice may be implemented as a crossbar switch or by a permuter circuit.

Each functional slice 105 also includes its own instruction queue (not shown in FIG. 1B) that stores instructions, and an ICU 110 to control issuance of the instructions. The instructions in a given instruction queue are executed only by tiles in its associated functional slice and are not executed by the other functional slice of the processor 100.

The processor 100 utilizes a tiled microarchitecture that allows scaling to different power envelopes. Tensor computations are performed using a streaming processing model where computational elements are arranged spatially by function. Each tile implements a specific function, and is stacked into a functional slice 105 in the two-dimensional on-chip mesh of the processor 100.

Each row of the two-dimensional on-chip mesh of the processor 100 contains a cross section of all functional slices. In this organization, each functional slice is independently controlled by a sequence of instructions specific to its on-chip role. For example, MEM slices support read and write operations but not add or multiply operations that are only supported by FP/INT slices. All tiles in the functional slice 105 execute the same instruction stream, i.e., the processor 100 supports the single instruction multiple data (SIMD) execution. Thus, a common instruction decode and dispatch logic can be factored out into its own tile (i.e., into the ICU 110). The ICU 110 decomposes the instruction execution pipeline into two portions: (i) instruction fetch, decode, and parceling and (ii) operand read, execute, and writeback. This approach decouples MEM subsystem from the functional units retrieving their operands and depositing results.

Figure 2A:
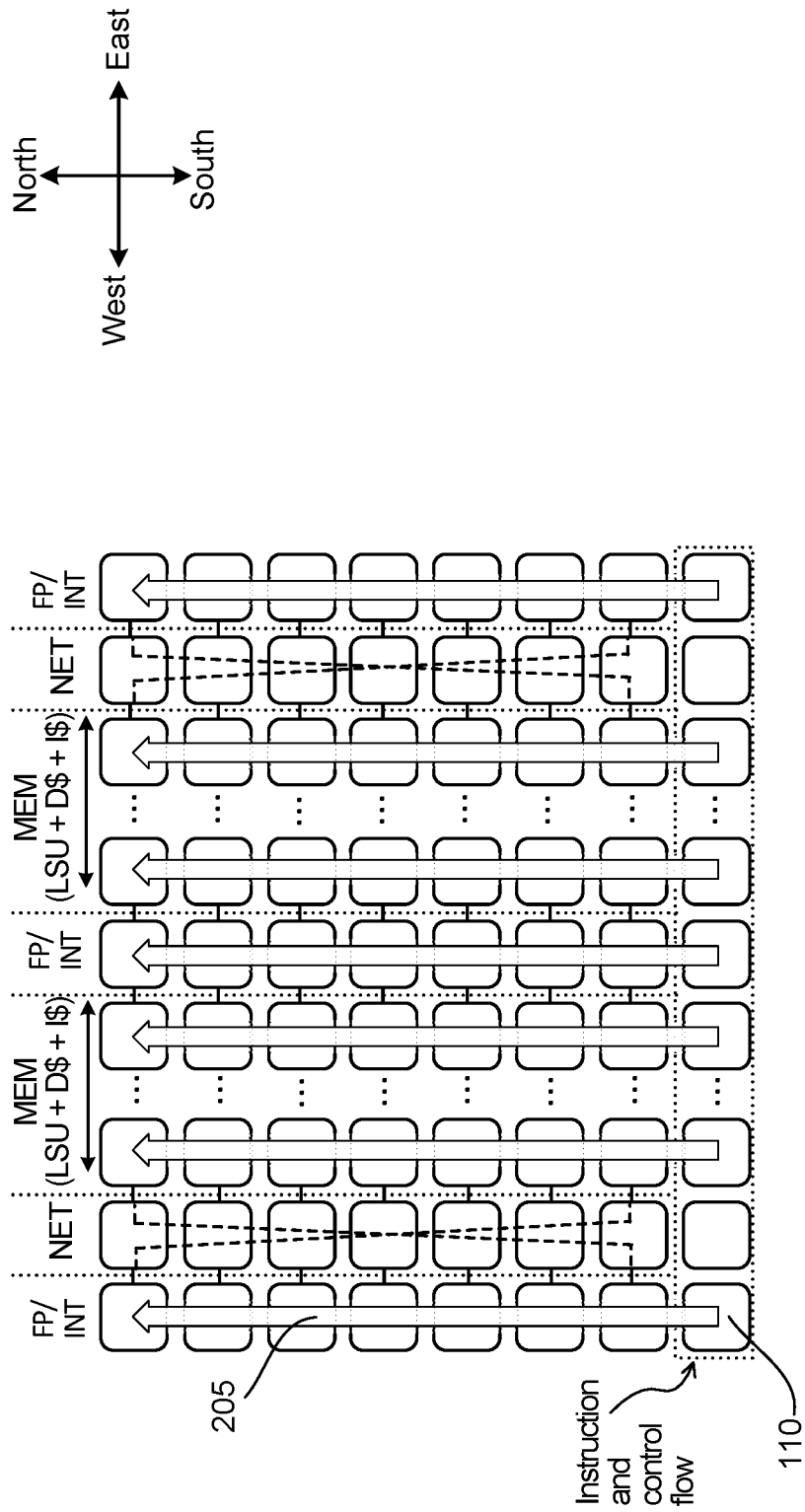
FIG. 2A illustrates the flow of instructions within the processor architecture, in accordance with some embodiments.
Figure 2B:
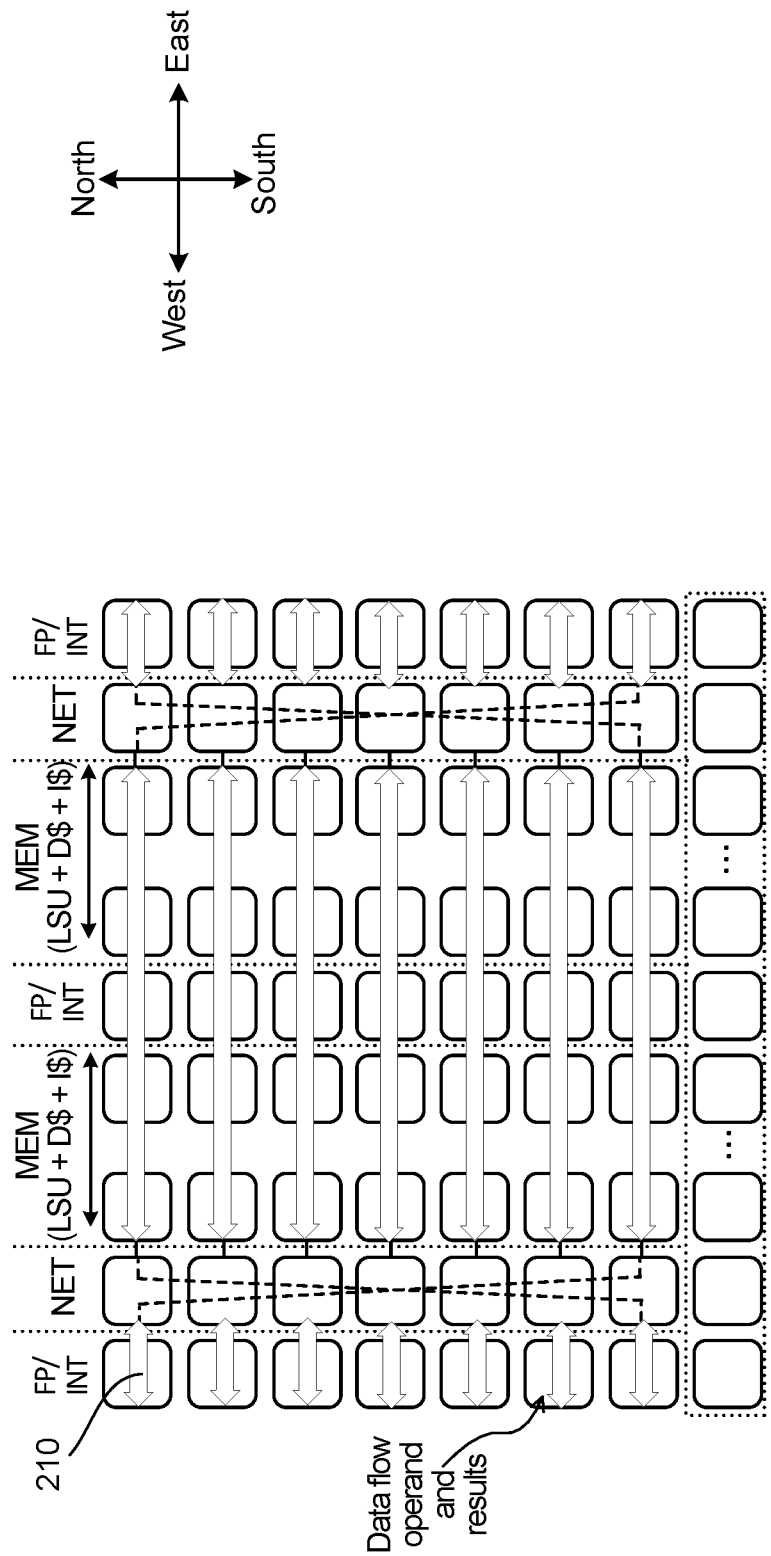
FIG. 2B illustrates data flow within the processor architecture, in accordance in some embodiments.

By arranging the tiles of the processor 100 into different functional slices 105, the on-chip instruction and control flow of the processor 100 can be decoupled from the data flow. FIG. 2A illustrates flow of instructions within the processor 100, in accordance with some embodiments. FIG. 2B illustrates data flow within the processor 100, in accordance in some embodiments. As illustrated in FIG. 2A, the instructions and control flow 205 flows in a first spatial dimension of the processor 100 (e.g., vertical spatial dimension) across tiles of the processor 100 (e.g., in a first direction along the length of the functional slices). As illustrated in FIG. 2B, the data flows 210 flow in a second temporal dimension of the processor 100 (e.g., horizontal dimension) across tiles of the processor 100 (e.g., in an orthogonal direction across the functional slices).

Thus, in the processor 100, the instruction and control flow 205 flows along the first spatial dimension (e.g., Y-dimension) from the ICUs 110 to the functional slice (e.g., in south-north direction), while the data flows 210 (operands and results) flow in the second spatial dimension (e.g., X-dimension) across the functional slices (e.g., in a spatial direction). The processor 100 is therefore implemented as X-dimensional mesh and Y-dimensional mesh (i.e., two-dimensional mesh) of tiles with X-Y-X dimension order routing. In order to support the movement of data flows 210 in a specific direction, each instruction issued by ICU 110 comprises information about a first hop direction (i.e., in the spatial direction) for an initial movement of corresponding data flow 210 across one or more data transport lanes along the second spatial dimension. Furthermore, each memory instruction includes information about an address for writing corresponding data flow 210 as well as information about a direction for movement of corresponding data flow 210 across one or more data transport lanes along the second spatial dimension to one or more specific functional slices for performing one or more operations on the corresponding data flow 210. The information about one or more directions for data movement stored in each instruction can be predetermined by the compiler.

The data flows 210 are routed through MEM slices and through permuters and lane-shifters of a switch execution module (SXM). The data flows 210 are designated as data streams by both an identifier (e.g., 0, 1, . . . , 31) and a direction, e.g., specified in a corresponding memory instruction. For example, in(28) designates the data stream 28 inward, whereas out(24) designates the data stream 24 toward an outward edge of on-chip mesh of the processor 100. Data flows 210 may move back and forth multiple times across the on-chip mesh of the processor 100 while being processed multiple times by functional slices.

In some embodiments, different functional slices of the processor 100 may correspond to MEM slices, VXM (vector execution module) slices, MXM (matrix execution module) slices, NIM (numerical interpretation module) slices, and SXM slices. Each functional slice may consist of N tiles that are all controlled by the same ICU 110. Thus, the processor 100 includes a plurality of tiles of a module type, e.g., MEM, VXM, MXM, SXM, ICU, chip-to-chip (C2C), etc. In some embodiments, each of the functional slices operates completely independently and can only be coordinated using barrier-like synchronization primitives or through the compiler by exploiting "tractable determinism."

In some embodiments, each tile of the processor 100 corresponds to an execution unit organized as an ×M SIMD tile. For example, each tile of the on-chip memory of the processor 100 may be organized to store an L-element vector atomically. As such, a MEM slice having N tiles may work together to store or process a large vector (e.g., having a total of N×M elements).

In some embodiments, the tiles in the same functional slice execute instructions in a "staggered" fashion where instructions are issued tile-by-tile within the slice over a period of N clock cycles. For example, the ICU for a given functional slice may, during a first clock cycle, issue an instruction to a first tile of the functional slice (e.g., the bottom tile of the functional slice as illustrated in FIG. 1B, closest to the ICU of the functional slice), which is passed to subsequent tiles of the functional slice (e.g., upwards) over subsequent clock cycles.

Data in the data flows 210 can be of different data types, e.g., INT8, FP8, INT16, FP16, INT32, FP32. Each stream of the data flows 210 may include multiple bytes, such as for larger data types (e.g., INT16, FP16, INT32, and FP32). The multi-byte data types are stream-aligned based on a size of the data type. For example, INT16 is aligned on a stream pair (i.e., bi-stream), whereas INT32 is aligned on a quad-stream (e.g., stream 0, 4, 8, etc.). The data alignment is accomplished by the compiler.

With the processor 100, functional slices interact with the data flows 210 in a producer-consumer fashion. That is, the functional slices consume operands from the data flows 210 and produce results onto a (possibly different) data flow 210. Conceptually, the functional slices are fixed, and data is flowing across their processing elements as shown in FIG. 2B. As the data flows through the functional slice, each functional unit may intercept the data operands and compute a result (e.g., if it is a processing element), or move data between data transport lanes on the network (e.g., if it is a switching element).

The data flows 210 provide a programming abstraction and are a conduit through which data flows between functional slices. Unlike general-purpose registers (GPRs), the functional slices in the processor 100 operate on the parallel data flows 210 flowing along the second spatial dimension (i.e., east or west) across the functional slices. The data flow 210 carrying operands and flowing across the second spatial dimension intercept the instruction and control flow 205 flowing across the first spatial dimension to perform a computation on a functional slice. The compiler possesses a detailed knowledge of the architectural state of processor 100, and utilizes the architectural state knowledge to ensure that a specific instruction and control flow 205 correctly intercepts a corresponding data flow 210. The term compiler is used herein broadly to refer to one or more executable software components that perform a number of processing steps and output instructions for configuring the processor 100 for performing specific operation(s).

Figure 3:
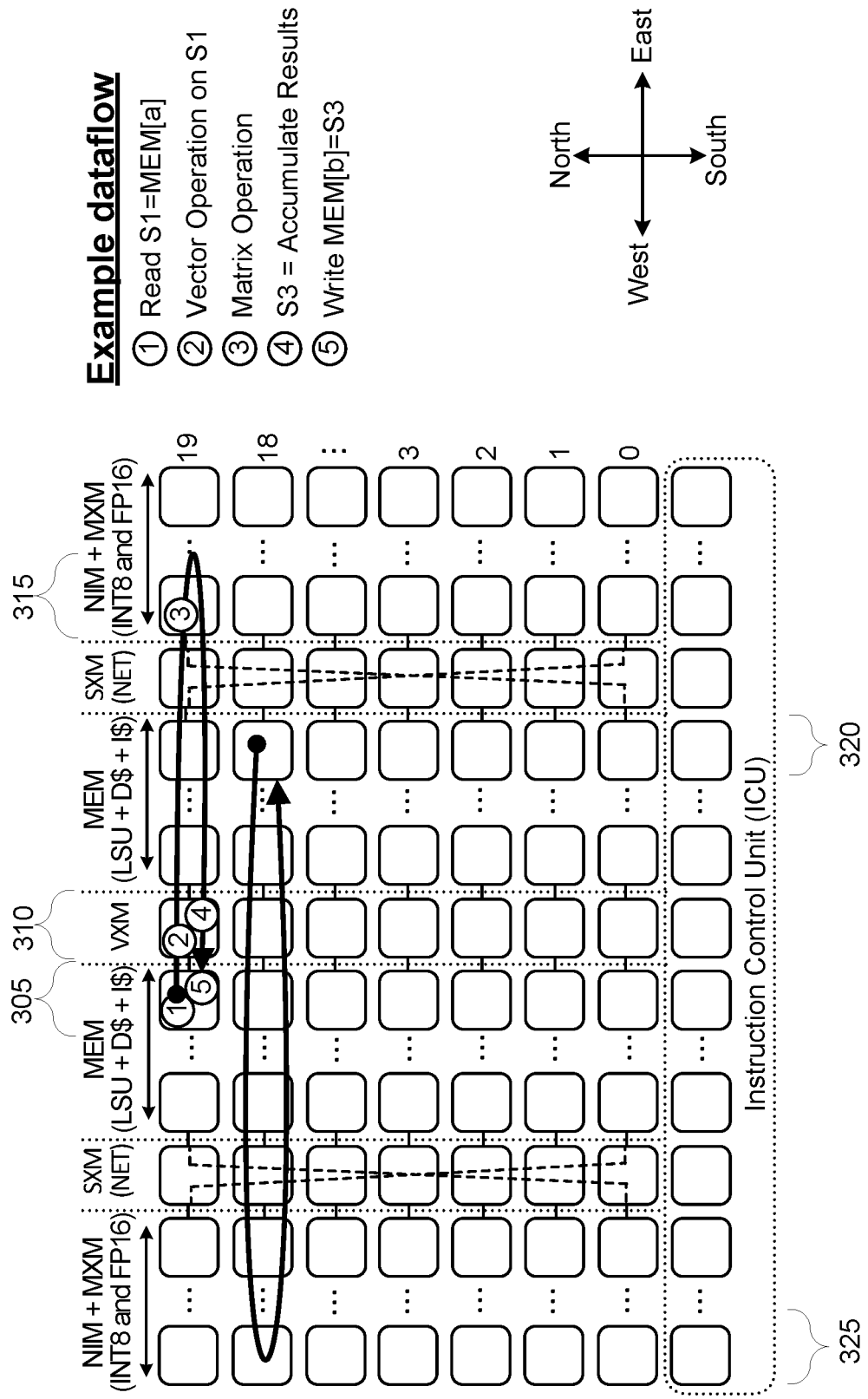
FIG. 3 illustrates an example of data flowing across the functional slices of a processor, in accordance with some embodiments.

In some embodiments, functional slices are arranged physically on-chip in such a manner to allow efficient data-flow for pipelined execution across, e.g., hundreds of clock cycles for common patterns. For example, FIG. 3 illustrates an example of data flowing across the functional slices of the processor 100, in accordance with some embodiments. As illustrated in FIG. 3, the functional slices of the processor 100 are arranged such that operand data read from MEM slice can be intercepted by different functional slices as it moves across a chip, and results flow in the opposite direction where they are ultimately written back to a memory. For example, a first data flow from MEM slice 305 may flow in a first direction, where the first data flow is intercepted by VXM slice 310 that performs a vector operation on the received data. The data flow then continues in the same direction (e.g., in accordance with information about a direction predetermined by the compiler and stored within a corresponding instruction) to MXM slice 315 which performs a matrix operation on the received data. The processed data may then flow in a second direction opposite from the first direction, where the processed data is again intercepted by the VXM slice 310 to perform an accumulate operation, and ultimately written back to MEM slice 305. While FIG. 3 illustrates that data flow performing a single "u-turn" (i.e., change in direction) corresponding to a single matrix operation before being written back to MEM slice 305, in some embodiments, a particular data flow may change direction multiple times (e.g., due to multiple matrix and vector operations) before the resulting data is written back into MEM slice 305.

In some embodiments, the functional slices of the processor 100 may be arranged such that data flow between MEM slices and other functional slices may occur in both the first and second direction. For example, FIG. 3 illustrates a second data flow originating from MEM slice 320 that travels in the second direction towards MXM slice 325, where the data is intercepted and processed by the VXM slice 310 en route to MXM slice 325. The results of the matrix operation performed by MXM slice 325 then flows in the first direction back towards MEM slice 320.

In some embodiments, configuring each tile of the processor 100 to be dedicated to a specific function (e.g., MEM, VXM, MXM), the amount of instructions needed to be processed by the tiles may be reduced. For example, while MEM tiles will receive instructions to read out or store operand data, in some embodiments, certain tiles (e.g., MXM) may be configured to perform the same operations on all received data (e.g., receive data travelling in a first direction, and output processed data in a second direction opposite to the first direction). As such, these tiles may be able to operate without having to receive explicit instructions or only receiving intermittent or limited instructions, potentially simplifying operation of the processor.

In order to achieve a preferred single-thread performance, a conventional multi-core processor design (e.g., as illustrated in FIG. 1A) typically needs to dedicate a significant portion of silicon area for exposing and exploiting instruction-level parallelism (ILP). This usually involves register renaming schemes and large instruction windows over which the instructions have no explicit understanding of the hardware on which the instructions will execute, all the while maintaining the illusion of in-order program execution. In contrast, when utilizing the processor 100 with the functional slice architecture, the compiler generates an explicit plan for how the processor 100 would execute a microprogram. The compiler specifies when each operation will be executed, which functional slices will perform the work, and which stream register files (described in greater detail below) hold the operands. The compiler maintains a high-fidelity (cycle accurate) model of a hardware state of the processor 100 so the microprogram can orchestrate the data flow.

In some embodiments, the processor 100 uses, e.g., a Web-hosted compiler that takes as its input a model (e.g., a machine learning model such as a TensorFlow model) and emits a proprietary instruction stream targeting a hardware of the processor 100. The compiler is responsible for coordinating the control and data flow of the program, and specifies any instruction-level parallelism by explicitly bundling instructions that can and should execute concurrently so that they are dispatched together. An architecturally-visible streaming register file functions as the conduit through which operands flow from MEM slices (e.g., SRAM) to other functional slices (e.g., VXM, MXM, etc.) and vice versa.

Lanes transport operands and results among functional slices. A common software pattern involves reading operand data from MEM slices that are subsequently consumed and operated on by a downstream arithmetic slice (e.g., VXM, MXM, etc.). The results of the operation are then produced onto corresponding lanes such that the results can be written back to MEM slices. For example, an addition operation of two vectors X and Y of size N, Z=X+Y, requires four instructions: Read S1, X and Read S2, Y are executed on two MEM slices and directed inward toward INT slice to perform Add S1, S2, S3. Lastly, the result is stored back to the memory via Write S3, Z.

An architecture of the processor 100 pushes complexities associated with instruction scheduling into the compiler. The compiler is configured to schedule instructions in order to use the functional slices of the processor 100 accurately and efficiently. The scheduling of instructions by the compiler may involve selecting one of several means by which an algorithm or meta-operation may be realized on the functional slices of the processor 100. Removing the control complexity of dynamic instruction scheduling for multi-issue execution units allows the ICU 110 to be relatively small, e.g., accounting for less than 3% of the chip area of the processor 100.

The compiler has access to several architecturally-visible states, i.e., (i) N-lane programming abstraction (e.g., N=320), (ii) I independent on-chip instruction queues (IQs)

(e.g., I=144), (iii) L logical streams per lane (e.g., L=64), and (iv) a globally shared SRAM of e.g., 220 MB. It should be noted that the values provided herein represent one specific embodiment of the processor 100, and in other embodiments of the processor 100 one or more of these values can be different.

Figure 4:
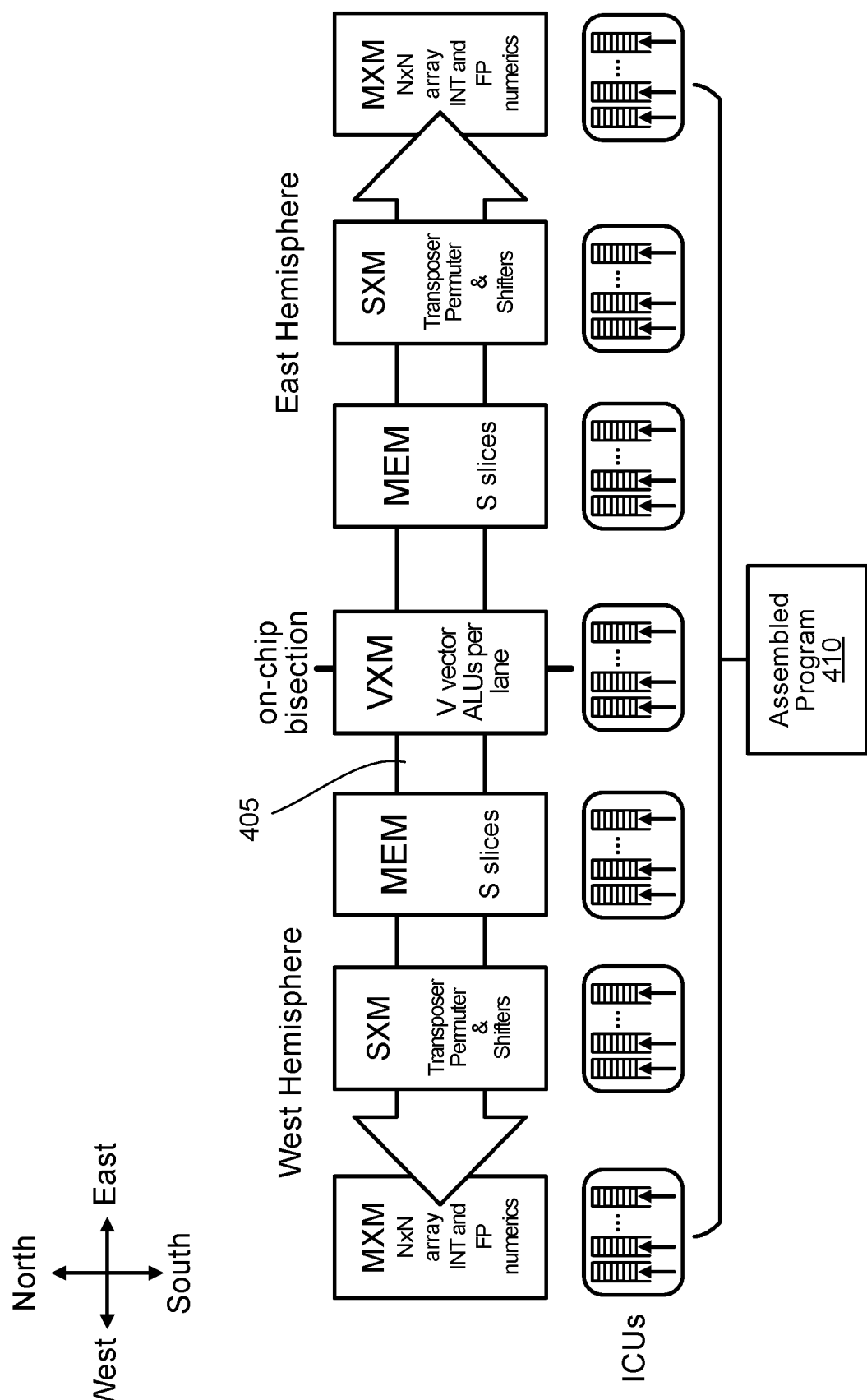
FIG. 4 illustrates organization and data flow within a row of a processor, in accordance with some embodiments.

FIG. 4 illustrates organization and data flow within a row of the processor 100, in accordance with some embodiments. As shown in FIG. 4, each row of the two-dimensional on-chip mesh of the processor 100 contains a cross section of all functional slices, i.e., N×N array of MXMs (e.g., N=320) configured for both INT and FP numerics (e.g., INT8 and FP16), S MEM slices (S=44), VXM slices with V vector ALUs per lane (e.g., V=16), and SXM slices. In this organization, each functional slice is independently controlled by a sequence of instructions specific to its on-chip role fetched by a corresponding array of ICUs (e.g., a total of I=144 ICUs). Conceptually, the functional slices are fixed and data 405 are flowing across their processing units. As the data flows through a specific functional slice, each functional slice can optionally intercept the data operands and compute a result (e.g., in case of MXM and VXM), or move data between data transport lanes on the network (e.g., in case of SXM and MEM).

In one embodiments, 320 lanes are overlaid on the processor 100 where each tile in the on-chip mesh operates on, e.g., 16-lanes in a SIMD manner. The 16-lane unit can be referred to herein as a "superlane" and represents a cross-section of all the functional slices on the chip. As such, a superlane may represent the architecture's minimum vector length (minVL) of, e.g., 16 elements. Likewise, the vertical composition of 20 tiles forming a functional slice may produce a maximum vector length (maxVL) of, e.g., 20×16=320 functional units. Each of the 144 independent on-chip ICUs can issue one or more instructions per clock cycle. The compiler has explicit control of a program order in each instruction queue, e.g., by generating an assembled program 410 for execution by the ICUs and functional slices. There are 64 logical streams per lane for moving operands or results on-chip with, e.g., 32 streams eastward and 32 streams westward. The 220 MB of globally shared SRAM may deliver 32 bytes per lane of stream bandwidth and low-latency access to model parameters. For example, MEM can read and MXM can install more than e.g., 100,000 weights into a 320×320 array (i.e., 320 lanes×320 functional units) in less than 30 clock cycles including SRAM and on-chip network transit delays.

Parallel Streams Programming Model

In some embodiments, the processor 100 performs execution of machine learning (ML) algorithms operating on vectors with coefficients of different hardware-supported data types (e.g., INT8, FP16, INT16, FP32, etc.). The vectors can be interpreted as an abstraction over underlying data whose elements can be processed by the same operation in a SIMD manner. In one or more embodiments, the processor 100 operates on vectors that can be organized into rank-2 tensors. The processor 100 utilizes the graph-lowering front-end compiler to transform higher rank tensors into rank-2 tensors over hardware-supported data types.

A programming model of the processor 100 represents a producer-consumer model where each functional slice acts as a consumer and a producer of one or more streams. When a vector is loaded from MEM, a stream identifier (e.g., 0, 1, . . . , 31) and a direction of flow (e.g., eastward, or westward) is assigned to the vector. Once the vector is loaded, the vector becomes a stream flowing in a defined direction. Operands of the stream are steered toward a functional slice that is consuming the operands and producing a result stream. Streams are constantly flowing across the processor 100, serving as the means by which functional slices communicate with one another.

Instruction Format

Figure 5:
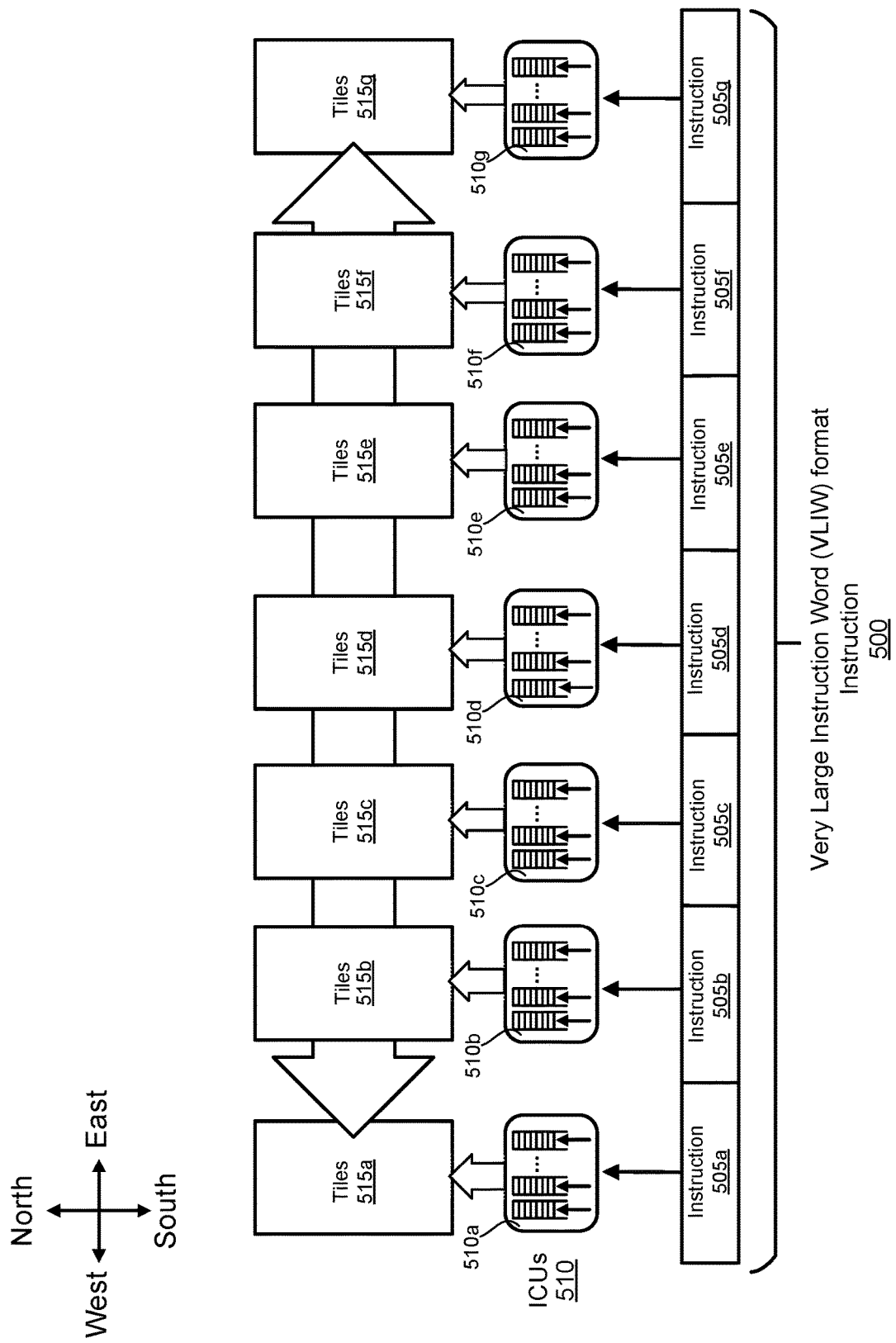
FIG. 5 illustrates an example format of an instruction executed by the processor, in accordance with some embodiments.

FIG. 5 illustrates an example format of an instruction 500 executed by the processor 100, in accordance with some embodiments. The instruction 500 has a format of very large instruction word (VLIW), and can be part of the assembled program 400 (e.g., assembled by the compiler). The VLIW instruction 500 can be parsed (e.g., by the compiler) into a plurality of discrete instructions, e.g., discrete instructions 505a-505g stored within a plurality of sub-fields of the VLIW instruction 500. Each discrete instruction 505a-505g is associated with a corresponding set of tiles, e.g., 515a-515g controlled by a specific subset of ICUs 510, e.g., ICUs 510a-510g. Each set of tiles 515a-515g may perform a same operation (e.g., arithmetic or memory operation), and may be organized as multiple functional slices.

Each discrete instruction 505a-505g is fetched by a corresponding subset of ICUs 510a-510g, and each discrete instruction 505a-505g is further dispatched (e.g., at a dispatch time determined by the compiler) onto a corresponding set of tiles 515a-515g for executing one or more operations specified by each discrete instruction 505a-505g. Each discrete instruction 505a-505g can be either SIMD type instruction or MIMD (multiple instructions multiple data) type instruction. In some embodiments, content of at least one of the sub-fields in the VLIW instruction 500 does not correspond to a valid discrete instruction (e.g., as assembled by the compiler), which can be indicated by a specific bit in the corresponding the sub-field of the VLIW instruction 500. This can happen when a corresponding set of tiles 515a-515g is not required to perform any operation. In such cases, the at least one sub-field of the VLIW instruction 500 would not be fetched by the corresponding subset of ICUs 510a-510g and thus would not be transmitted to the corresponding set of tiles 515a-515g for execution.

Discrete instructions 505a-505g may comprise either 8- or 32-bit op codes in one embodiment. Discrete instructions 505a-505g each comprise a functional slice specific operation code that causes execution of a functional operation without reference to either the data to be operated on or the result. Furthermore, a discrete instruction 505a-505g of a special type (e.g., "no operation" (NOP) instruction) comprises, e.g., 8-bit operation code. In one or more embodiments, each instruction queue of a corresponding subset of ICUs 510a-510g is associated with a corresponding functional slice (e.g., set of tiles 515a-515g), and instructions in the instruction queues in the corresponding subset of ICUs 510a-510g comprise a functional slice specific operation code.

In one or more embodiments, the VLIW instruction 500 is sent from, e.g., a host server to the processor 100 via a PCIe (peripheral component interconnect express) interface as a "decompressed instruction" of a first size. In one or more other embodiments, the VLIW instruction 500 is sent from, e.g., the host server to the processor 100 via the PCIe interface as a "compressed instruction" of a second size smaller than the first size. By sending the compressed VLIW instructions 500 over, e.g., the PCIe interface having a limited communication bandwidth, stalling of VLIW instruction(s) 500 can be avoided when scheduling the VLIW instructions 500 for execution. In some embodiments, the "compressed" VLIW instruction 500 can be decompressed upon being fetched by ICUs 510.

Instruction Set Architecture

The compiler presented herein performs resource allocations in both time and space across chip area of the processor 100. Hence, the compiler is configured to resolve a two-dimensional (i.e., time-space) scheduling of the instruction and control flows 205 and the data flows 210. Through the accurate scheduling of instructions and operands, the compiler provides for precise matching (intersection) in time and space of specific data flows 210 with corresponding instruction and control flows 205.

An instruction set architecture (ISA) of the processor 100 exposes temporal information about each instruction to allow the compiler precise control of each instruction's dispatch time. Each instruction can be augmented with the following temporal parameters: a functional delay ($d_{func}$) and an instruction-operand skew ($d_{skew}$). Each instruction requires one or more clock cycles to produce its stream output, which represents a functional delay timing parameter. The functional delay timing parameter allows the compiler to determine when an output of an instruction will be available on the architecturally-visible stream registers. The instruction-operand skew parameter can be defined as a timing relationship between the instruction dispatch time relative to when its stream operands are required. An instruction-operand skew parameter for an instruction informs the compiler how to schedule operand(s) arrival times with an instruction dispatch time in order to get the operand(s) and the instruction to properly intersect at a corresponding tile at a specific time (i.e., to intersect in time and space). The functional delay timing parameter and the instruction-operand skew parameter are necessary to track the exact spatial relationship between instructions and operands across the area of processor 100.

An execution time T of an instruction includes a functional delay of the instruction and a stream propagation (transit) delay to flow from a stream register location i ($SR_i$) to a stream register location j ($SR_j$), i.e., $$T = N + d_{func} + \delta(j,i), \quad (1)$$

where N is a number of tiles in a functional slice, $d_{func}$ is a functional delay of the instruction being executed (e.g., in clock cycles) for an output stream to appear on the $SR_i$, and $\delta(j,i)$ is a transit delay distance (e.g., in clock cycles) between the $SR_j$ and the $SR_i$.

ISA of the processor 100 defines instructions spanning several different functional areas, e.g., ICU, MEM, VXM, MXM, SXM, C2C, etc. The partitioned global address space presented by MEM slices provides memory semantics for vectors to be addressed from SRAM and loaded into an architecturally-visible stream register with a direction of dataflow toward the functional slice intending to operate on the vectors.

Instructions in Instruction Control Unit

Instructions in ICU are common for all functional slices. As such, the instructions contain common instructions, such a "no operation" (NOP) and "Repeat", and synchronization primitives "Sync" and "Notify" for allowing independent functional slices to be initially synchronized so the compiler can accurately determine instruction execution times and allow cooperative parallelism among the functional slices. ICU provides explicit instruction fetching using "IFetch" instruction, and inter-slice synchronization using "Sync" and "Notify" instructions to perform a chip-wide barrier synchronization among participating functional slices. In some embodiments, the ICU may issue a "Config" instruction to configure low-power mode of the processor 100.

A repeated "NOP" instruction allows for precise cycle-by-cycle control of inter-instruction delay. For example, the compiler has cycle-accurate control when scheduling two operations Op. A and Op. B using an intervening "NOP" so that N clock cycles separate the operations A and B, i.e., Op. A NOP(N) Op. B. The repeated "NOP" has a repeat count 16-bit field which allows a pause between two operations between, e.g., 1 ns and 65 µs for 1 GHz clock frequency. Thus, the compiler can utilize explicit "NOP" instructions to provide temporal separation between two instructions in the program order, and to control relative timing of the functional slices and data on which the functional slices operate. The repeated "NOP" can be implemented in the ICU's tile and is common to all functional slices. While the "NOP" instruction may be the most common instruction, the "NOP" instruction is not programmer-visible as the compiler inserts the "NOP" instruction(s) implicitly.

Each functional slice is independent. However, the compiler keeps track of a logical program time of each functional slice. The logical program time is conceptually similar to a program counter in a conventional CPU, except that the compiler tracks the state of, e.g., 144 independent instruction queues (IQs) on a cycle-by-cycle basis. Thus, at a specific logical time, the compiler knows a state of each IQ on the chip. The "NOP" instruction may be used to coordinate the temporal relationship between instructions in the same IQ, or between instructions in different IQs. In addition to the repeated "NOP" instruction, a higher-level synchronization may be provided across all functional slices on the chip in order to achieve program correctness.

The higher-level synchronization is the role of "Sync" and "Notify" instructions. The "Sync" and "Notify" instructions provides a barrier synchronization mechanism across all 144 independent IQs on the chip. One IQ can be designated as a notifier, and the notifier IQ issues a "Notify" instruction while all other IQs are parked on a "Sync" instruction. The receipt of the "Notify" instruction is broadcast to all the IQs to satisfy the pending "Sync" and begin processing instructions again.

The barrier synchronization may be required once after the chip resets. In some embodiments, each program may start with a set of "preamble" instructions which configure each tile. After that a "Sync" instruction may be executed to ensure that all functional slices are aligned to the same logical time. In one or more embodiments, a chip-wide barrier synchronization can be accomplished in e.g., 35 clock cycles, from a time instant the "Notify" instruction is issued to another time instant when the "Sync" instruction is satisfied and retired to allow subsequent instructions to flow. Following the compulsory barrier synchronization, the functional slices can compute and communicate results in a synchronization-free manner through stream registers.

"Repeat (n, d)" is an ICU instruction that can be issued to repeat a previous instruction n times, with d clock cycles between each iteration. By allocating a variable delay between iterations, the compiler can temporally align the repeated instruction with its operands in-flight. This mechanism allows arithmetic slices (which are often highly iterative) to encode instructions more efficiently by making better use of MEM slices and reducing a number of "Ifetch" instructions. An "Ifetch" instruction has a single stream operand which carries the instructions in their program order, filling the IQ with, e.g., 640-bytes of instructions (i.e., a pair of 320-byte vectors). All functional slices can fetch instructions simultaneously with normal instruction execution. The compiler prefetches the instructions to keep all, e.g., 144 IQs busy on each clock cycle by inserting "Ifetch"

instructions into every functional slices' instruction stream. A precise notion of "logical time" is maintained across the chip area of the processor 100 so long as at least two IQs are not empty.

Vector Processor and Scalable Vectors

The underlying data type supported by the processor 100 is a vector data type, i.e., rank-2 tensors. A number of elements in each vector can vary from 16 elements (i.e., one superlane) up to 320 elements utilizing all 20 on-chip superlanes. Thus, the minimum vector length is 16 bytes and the maximum vector length is 320 bytes. As the vector length can vary from 16 to 320 elements, an instruction "SetVL" (set vector length) can be used for configuring a specific tile in a low-power mode to effectively power-down any unused superlane and reduce an amount of power consumed by the processor 100. The "SetVL" instruction sets unused superlanes to inactive power state, i.e., the "SetVL" instruction disables inactive superlanes. The semantic "SetVL(n)" sets a maximum number of valid elements of a vector to n×16, and the remaining superlanes are set to "inactive" and the low-power mode by gating the instruction execution pipeline. Thus, by scaling vectors of the processor 100 (e.g., by increasing the vector length from 16 to 320 bytes in 16-lane steps) and powering-down the unused tiles, a more energy-proportional system can be yielded.

In addition to the "SetVL" instruction, VXM employs other instructions (operations): (i) "unary instruction" for performing a point-wise operation on a single operand producing a single result; (ii) "binary instruction" for performing a point-wise operation with two operands producing a single result; (iii) "type conversion instruction" for performing a conversion of fixed point data type to floating point data type and vice versa; (iv) "ReLU" instruction for a performing rectified linear unit activation operation; (v) "Tan H" instruction for performing a hyperbolic tangent activation operation; (vi) "Exp" instruction for performing an exponentiation $e^x$ operation; (vii) "RSqrt" instruction for performing a reciprocal square root operation.

In some embodiments, VXM consists of e.g., a 4×4 mesh of arithmetic logic units (ALUs) in each lane for point-wise arithmetic operations on vectors. Each superlane may implement a 4×4 mesh of ALUs capable of executing ×16-SIMD computations, i.e., 16 vector ALUs per lane. Each of the ALU's 32-bit input operands can be organized along a naturally aligned quad-stream group. The vector ALUs may not produce condition codes or status flags from a previous instruction, i.e., the vector ALUs are stateless. Instead, VXM provides both saturating and modulo variants for addition and multiplication operations (e.g., "ADD_SAT", "ADD_MOD", "MUL_SAT", "MUL_MOD"), thus allowing differing semantics for handling arithmetic exceptions. The processor 100 can support chaining together two or more vector ALUs within each lane, allowing multiple ALU operations to be performed without committing intermediate results to MEM, thus saving a write and subsequent read of each intermediate result. This allows for efficient parallel implementations of algorithms for, e.g., batch normalization, quantization, "ReLU" activation function, etc.

Tensors (i.e., higher dimensional vectors) provide a preferred data structure for energy-proportional computing platform of the processor 100. A "shape" of tensors of every layer is known, i.e., the vector length (inner dimension) and streaming time (outer dimension) are known. For example, a 2×224×224×3 tensor can be lowered by the compiler to a rank-2 tensor [outer, inner], e.g., to [1176, 256] rank-2 tensor (i.e., the vector length of 256 elements) or [2352, 128] rank-2 tensor (i.e., the vector length of 128 elements). Thus, the vector length is a preferred tool for controlling utilization of resources in the processor 100 and thus for controlling an amount of consumed power at the processor 100. In some embodiments, each stream has a "valid/empty" bit for tracking the stream's load-to-use time beyond which the stream is considered logically expired and no longer propagated. A reduced consumption of dynamic power at the processor 100 can be achieved by accurately tracking liveness of every operand using the "valid/empty" bit.

Matrix Execution Module

In some embodiments, MXM comprises four independent two-dimensional multiply-accumulate (MACC) arrays operating on, e.g., INT8 or FP16 data types. MXM can provide four independent MXM planes of MACC units. Each MXM plane comprises, e.g., twenty 16×16 supercells that produce a partial-sum each clock cycle and pass the partial-sum to an adjacent tile for use in its computation. Each MXM plane utilizes sixteen data flows 210 each having 16 bytes to install 256 8-bit weights in each supercell on every clock cycle. The utilization of 32 data flows 210 in each direction (i.e., westward and eastward direction) allows emplacing weights in two MXM planes simultaneously on both MXM hemispheres, loading e.g., 409,600 weights on-chip in less than about 40 clock cycles. With the weights installed, MXM can generate in each clock cycle a new INT32 dot-product of input activations. Outputs from MXM can be accumulated using accumulators on each INT32 or FP32 output stream.

In some embodiments, MXM supports numerics for both integer and floating point data types (e.g., INT8 and FP16) by utilizing two MXM planes simultaneously for generating floating point (e.g., FP16) results. The 320-element dot-product sum is produced for each output by applying a single rounding step for conversion to INT32 or FP32 results. MXM can perform several operations (instructions), i.e., (i) "LW" instruction for loading weights from data flows (streams) to a weight buffer in MXM; (ii) "IW" instruction for installing weights from either data flows or a LW buffer into the 320×320 array; (iii) "ABC" instruction for activating buffer control to initiate and coordinate arriving activations; (iv) "ACC" instruction for accumulating either integer or floating point (e.g., INT32 or FP32) result generated by MXM.

Switch Execution Module

SXM performs functions (operations) for transposition, permutation, shifting, and/or rotation of data elements. Collectively, the SXM operations can be used for performing tensor reshape operations common to ML workloads and fulfilling the functionality of NET slice of FIG. 1B. As aforementioned, on-chip data movement in the processor 100 can be carried out by routing data in two spatial dimensions: propagating streams (i.e., the data flows 210) in the between MEM and functional units within each superlane, and between superlanes using the SXM to move streams (i.e., the instruction and control flows 205) from one superlane to the SXM of another superlane. The SXM provides two sets of lane shifters that execute shift instructions to adjacent superlane. The lane-shifters can be allocated in pairs. A vector can be shifted up or down, and either (i) north-shifted data, (ii) south-shifted data, or (iii) unshifted data can be selected from vector elements. Each SXM has a pair of lane shifters, for a total of four on-chip shifters. In addition, SXM may provide a permute instruction that employs a configurable bijection for remapping e.g., 320 lanes onto a set of streams, one per superlane.

A distributor slice within SXM can be used to arbitrarily remap 16 lanes within each superlane. As streams pass through the SXM's distributor, the streams can be either remapped at full bandwidth, or zero-filled (e.g., any or all 16 elements). This provides an efficient mechanism for common tensor operations, such as zero padding or rearranging filter elements.

A very common operation executed on tensor data types is transposition. SXM supports a two-dimensional transposition of e.g., 256 elements organized as 16 streams each with 16 elements. The transposition operation can utilize 16 incoming streams and produce 16 output streams with rows and columns being exchanged. The transposition operation allows an efficient movement of data from an atomic 16-byte MEM word into 16 different MEM slices where the data are being addressable. There are two instances of on-chip SXM in the processor 100, one in each hemisphere. SXM is each hemisphere can issue two transposition instructions, thus yielding a maximum of four simultaneous 16×16 transposition operations.

On chip data movement can utilize SXM for intra-superlane and inter-lane switching by rearranging elements of vectors. SXM is analogous to a NET interface for performing communication between cores illustrated in FIG. 1B. MEM and SXM can work in tandem to form the two-dimensional on-chip mesh of the processor 100. In one embodiment, the processor 100 comprises 44 parallel slices of SRAM (e.g., MEM slices) and provides the memory concurrency to fully utilize 32 data streams in each direction. Each MEM slice can provide e.g., 13-bits of physical addressing of 16-byte memory words, each byte mapping to a specific lane of the processor 100. The total on-chip MEM capacity is then 213(16B)×88 slices, which equals to 220 MB.

Chip-to-Chip Communication

Multi-chip systems including multiple processors 100 can be implemented in a variety of topologies for flexible packaging and deployment in, e.g., rack-scale and cluster-scale systems. In some embodiments, communication among multiple processors 100 can occur in a pair-wise manner between a port of a sender processor 100 and a port of a receiver processor 100. The sender processor 100 can thus perform a "MEM Read" instruction to read an address onto a stream heading toward, e.g., SXM of the sender processor 100. SXM of the sender processor 100 can perform a "Send" instruction on a C2C slice of the sender processor 100. The C2C slice represents a physical port where data is transmitted to the receiver processor 100. On the other side of a communication channel at the receiver processor 100, after a fixed delay for time-of-flight on the communication channel, the receiver processor 100 can perform a "Receive" instruction to pull, e.g., a 320-byte vector off the communication channel for every "Receive" instruction being issued. In some embodiments, the packaging hierarchy can be expanded from a single-chip board to a multi-chip board with multiple interfaced processors 100. The dynamic power may be scaled from, e.g., 35 W to 350 W for a wide range of applications, thus increasing the dynamic range of systems and solutions.

As aforementioned, the C2C slice supports "Send" and "Receive" primitives for exchanging, e.g., 320-byte vectors between a pair of sender-receiver processors 100. In some embodiments, the processor 100 has a total of sixteen (16) ×4 links that can be flexibly partitioned to support a high-radix interconnection network of processors 100 for large-scale systems. The host interface for PCIe (peripheral component interconnect express) can be also handled at the C2C slice. The C2C slice provides a DMA engine to emplace a model onto MEM slice and provides an entry point for bootstrapping an execution of the model. The C2C slice can also provide a general mechanism for passing MSI-Xs (message signaled interrupts) to a host processor 100, e.g., in the event of a multi-bit memory error. A sequence of instructions performed on different functional slices can be chained to create more complex actions without writeback of intermediate results to MEM slices. This allows for efficient processing of streams at a full bandwidth and a latency below a threshold latency.

Processor Memory

MEM slices in the processor 100 can serve as: (1) storage for model parameters, microprograms and data on which they operate, and (2) network-on-chip (NoC) for communicating data operands from MEM slices to other functional slices of the processor 100 and computed results back to MEM slices. In one embodiment, MEM slices consumes approximately 75% of the chip area of the processor 100. In some embodiments, due to the bandwidth requirements of the processor 100, MEM slices comprise SRAM slices, and not DRAM slices.

The capacity of MEM slices in the processor 100 determines: (i) a number of ML models that can simultaneously reside on-chip, (ii) a size of any given model, and (iii) partitioning of large models to fit into multi-chip systems.

Figure 6A:
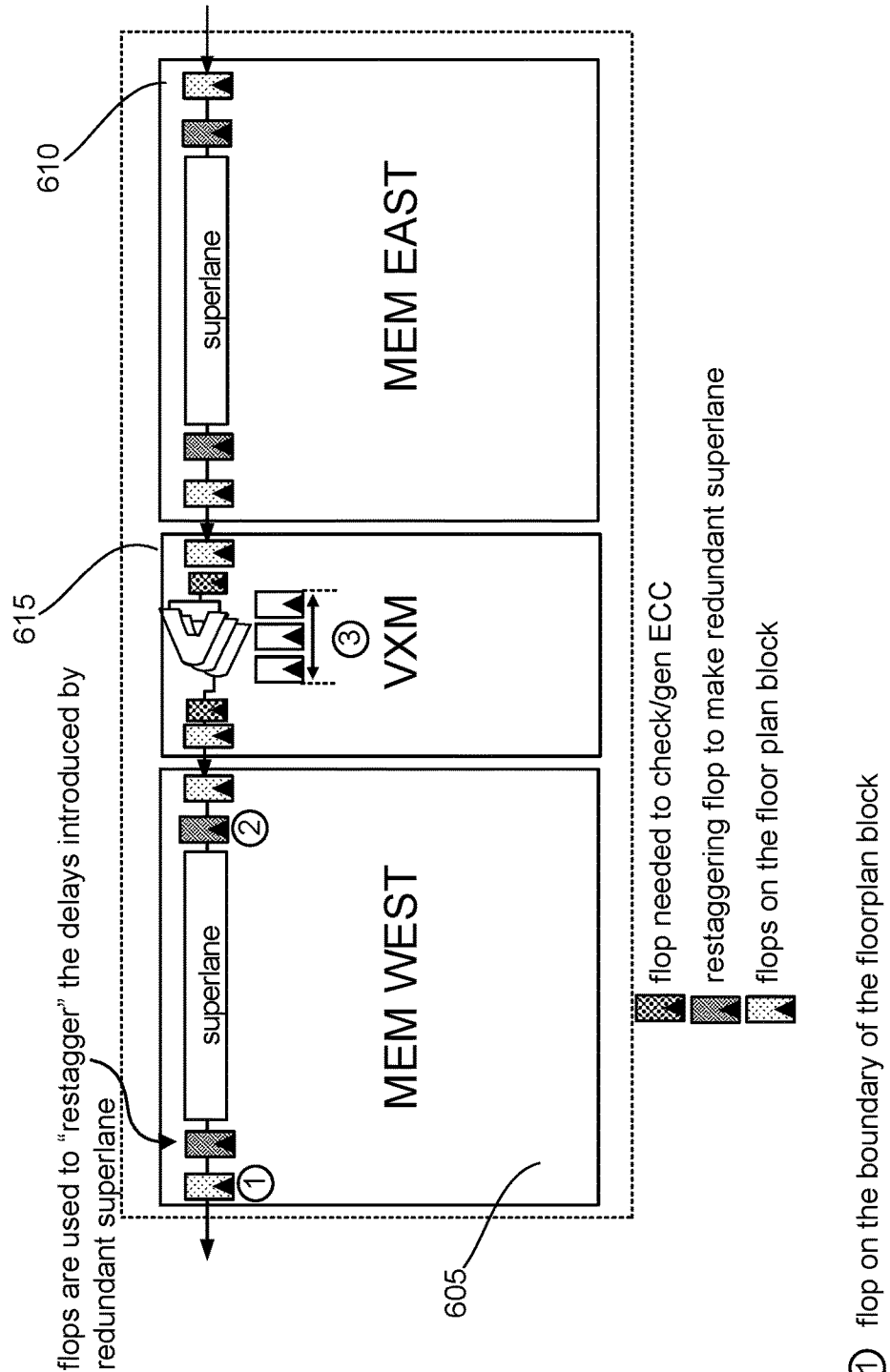
FIG. 6A illustrates a diagram of a memory system, in accordance with some embodiments.

FIG. 6A illustrates a diagram of the MEM system comprising MEM slices, in accordance with some embodiments. The MEM slices may be physically numbered {0, . . . L}. The direction of data transfer towards the center of a chip may be referred to as inwards, while data transfer toward the outer edge of the chip may be referred to as outwards.

In some embodiments, a SRAM of each memory tile is considered a pseudo-dual-ported SRAM since simultaneous reads and writes can be performed to the SRAM as long as those references are to different banks within the SRAM. On the other hand, two R-type (read) or W-type (write) instructions to the same internal bank cannot be performed simultaneously. In other words, a memory tile can handle at most one R-type and one W-type instruction concurrently if they are accessing different internal SRAM banks of the memory tile.

In some embodiments, each superlane may be connected to one or more boundary flops at each boundary of the MEM slices. In addition, each superlane may further be connected to one or more additional flops used to add a delay to data transmitted over the superlane, in order to restagger delays that may be caused by a "dead" or defective memory tile in a superlane. For example, in some embodiments, if a particular memory tile is determined to be defective, the superlane containing the defective memory tile may be marked as defective, and an additional redundant superlane substituted in. The restagger flop may be used to hide an additional delay associated with the redundant superlane and preserve timing. In some embodiments, a superlane may contain a pair of restagger flops, corresponding to different directions of data flow (e.g., ingress and egress), which may be enabled to add an extra delay or bypassed (e.g., via a MUX). For example, when a redundant superlane is used, superlanes south of the redundancy may be configured to implement their respective egress restagger flops, while superlanes north of the redundancy may implement their respective ingress restagger flops.

In some embodiments, as shown in FIG. 6A, VXM slices 615 are located between a hemisphere 605 (e.g., west hemisphere) and a hemisphere 610 (e.g., east hemisphere) of the MEM system. The VXM slices 615 may have a fall-through latency, indicating a number of clock cycles needed for data travelling across the one or more functional slices that is not intercepted for additional processing. On the other hand, if the data is intercepted by the VXM slices 615 for performing additional operations, a number of additional predetermined number of clock cycles may be needed.

In some embodiments, the MEM slices do not check an error correcting code (ECC) on read instructions, nor do they generate a valid ECC on write instructions. For indirect accesses, the addresses are flowed through the VXM slices 615 with an (ADD, 0) or some similar idempotent operation. The VXM slices 615 check the incoming stream operands' ECC and generate a valid ECC on the result.

Stream Register Files (Streams)

Figure 6B:
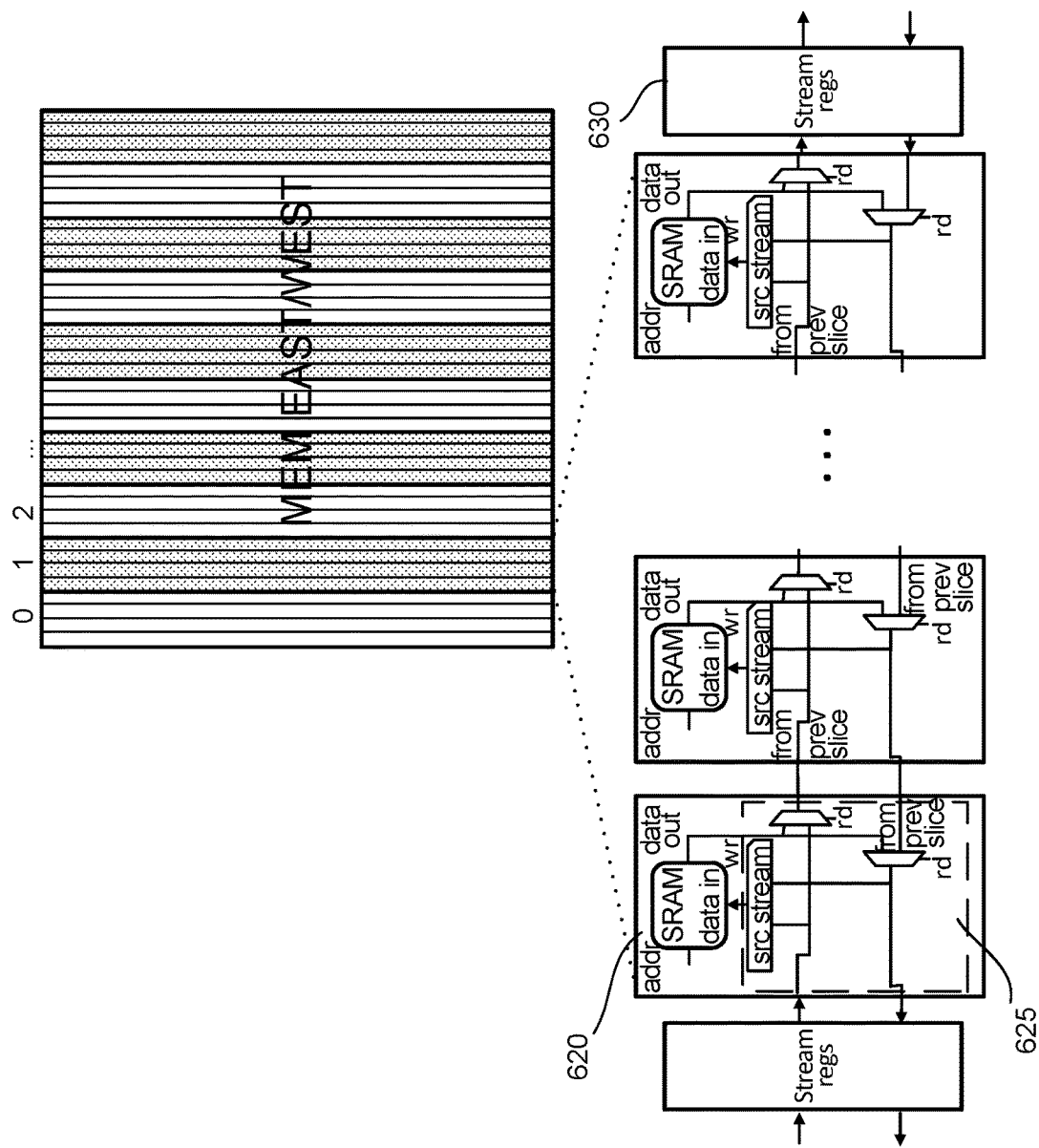
FIG. 6B is a diagram illustrating organization of a memory slice within the memory system, in accordance with some embodiments.

FIG. 6B is a diagram illustrating organization of a MEM slice, in accordance with some embodiments. A streaming register file, referred to as a 'STREAM', transfers operands and results between SRAM of MEM slices and other functional slices (e.g., VXM, MXM, etc.) of the processor 100. In some embodiments, a plurality of MEM slices (e.g., between 2 and 10 adjacent MEM slices) are physically organized as a set. Each set of MEM slices may be located between a pair of STREAMs 630, such that each MEM slice is able to read or write to the STREAMs in either direction. By placing STREAMs 630 between sets of MEM slices, a number of cycles needed for data operands to be transmitted is decreased (e.g., by a factor corresponding to the number of slices per set). The number of MEM slices per set may be configured based upon a distance over which data may be transmitted over a single clock cycle.

As illustrated in FIG. 6B, the tiles of each MEM slice each comprise a memory 620 (e.g., SRAM) and superlane circuitry 625 for routing data to and from the memory tile. The superlane circuitry 625 allows for each tile to read data from the superlane (e.g., from a STREAM or an adjacent tile), write data onto the superlane, and/or pass through data to a subsequent tile along the superlane. In some embodiments, any MEM slice can use any register of the STREAM 630, however, care must be taken so that two slices within the same set (e.g., quad-slice) are not simultaneously trying to update the same register. The compiler may configure the program during a compile time to ensure that no conflict occurs when accessing the registers.

The STREAMs 630 are architecturally visible to the compiler, as well as to the server as the primary hardware structure through which the compiler has visibility into the program's execution. The registers may comprise scalar registers (R0, R1, . . . , Rn) and vector registers (V0, V1, . . . , Vn).

Figure 7A:
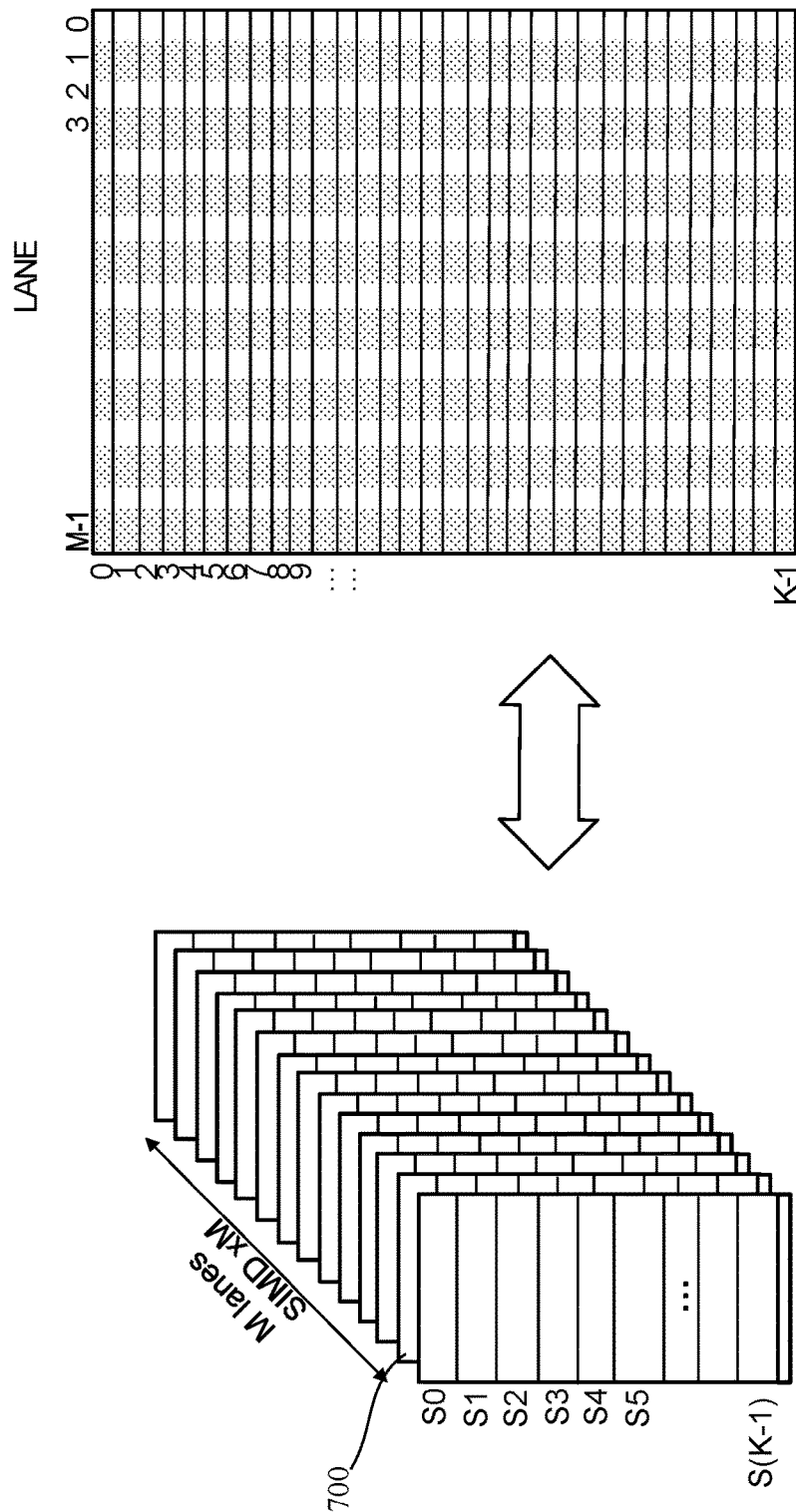
FIG. 7A illustrates a stream register file, in accordance with some embodiments.

In some embodiments, each STREAM 630 comprises a plurality of stream registers S0, S1, . . . , S(K−1) collectively forming the STREAM 630. In some embodiments, the processor uses a set of exception flags and the architecturally visible stream registers S0, S1, . . . , S(K−1) to communicate operands from MEM slices to the other functional slices, and computed results from the other functional slices back to MEM slices. In some embodiments, the STREAM 630 is a two-dimensional register file (e.g., as illustrated in FIG. 7A), with a first dimension corresponding to a stream identifier (S0, S1, etc.), and a second dimension corresponding to a lane.

In some embodiments, each superlane connecting the tiles of different functional slices corresponds to a plurality of lanes bundled together. A "lane" may correspond to the basic construct for delivering data between MEM slices and the other functional slices. A plurality of lanes (e.g., M lanes) are bundled together into a MEM word (e.g., a superlane), which allows for SIMD computation for the functional slices of the processor. Similarly, a plurality of corresponding data may be aggregated to form a superstream corresponding to a ×M vector, where M corresponds to the number of aggregated data in the superstream. Taken together, the processor may have a plurality of superlanes, yielding a vector length corresponding to a product of the number of superlanes N and the number of lanes per superlane M.

In some embodiments, the stream registers are sized based upon the basic data type used by the processor 100 (e.g., if the processor's basic data type is an INT8, each stream register of the STREAM may be 8-bits wide). In some embodiments, in order to support larger operands (e.g., FP16, INT32), multiple stream registers of a STREAM may be collectively treated as comprising one operand. In such cases, the operand data types are aligned on proper stream register boundaries. For example, FP16 treats a pair of stream registers as a 16-bit operand, and INT32 groups a bundle of four stream registers to form a larger 32-bit data.

In some embodiments, a number of stream registers K implemented per STREAM is based upon an "arithmetic intensity" of one or more functional slices of the processor 100. For example, in some embodiments, the MXM slices of the processor 100 are configured to take up to K streams of input. As such, each STREAM may comprise K stream registers configured to transmit operand data in each direction (e.g., inwards and outwards), allowing for K inputs to be provided to the MXM slices of the processor 100. For example, in some embodiments, the processor 100 may comprise VXM slices having VXM tiles configured to consume one stream per operand (total of 2 streams) to produce one stream of results, and MXM slices having MXM tiles configured to take up to K stream registers of input and produce up to multiple streams of output (e.g., <K) per cycle. As such, the processor 100 may comprise K stream registers per STREAM configured to transmit operand data inwards towards the MXM, and K stream registers per STREAM configured to transmit operand data outwards from the MXM.

FIG. 7A illustrates an example STREAM 700, in accordance with some embodiments. The STREAM 700 is an embodiment of the STREAM 630. The STREAM 700 may be configured be able to store data corresponding to a number of streams K, each stream having a plurality of elements (e.g., INT8 elements) corresponding to a superlane (e.g., M lanes), allowing for multiple superlanes of data to be provided to or received from a tile of the processor 100.

Figure 7B:
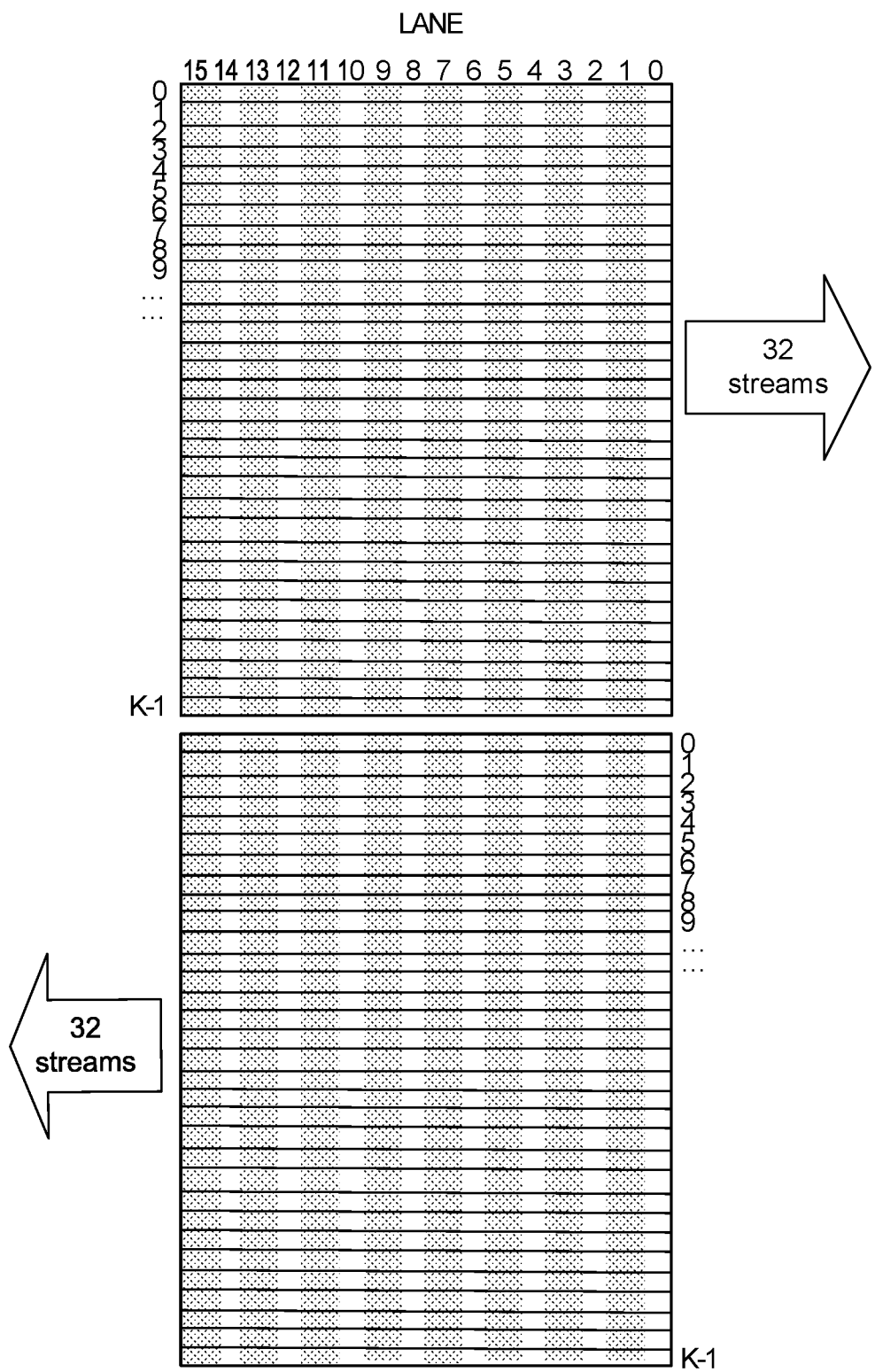
FIG. 7B illustrates stream register flow in a stream register file, in accordance with some embodiments.

FIG. 7B illustrates stream register flow in a STREAM of a functional slice processor (e.g., the processor 100), in accordance with some embodiments. As illustrated in FIG. 7B, the STREAM comprises stream registers allowing for data to flow in two directions (e.g., inwards and outwards).

For the sake of exposition, 1 GHz operating frequency of the processor's 100 clock can be considered. The STREAM bandwidth, B, exported by each MEM interface on the East and West edge of each MEM hemisphere can keep the functional units adequately fed with data operands in order to saturate the peak arithmetic capacity of the functional units. The STREAMs provide a combined capacity of 20 TiB/s of read (operand) and write (result) bandwidth, i.e., $$B = 2 \text{ directions} \times 32 \frac{\text{bytes}}{\text{lane}} \times 320 \text{ lanes} = 20 \ TiB/s \tag{1}$$

Since the SRAM banks are shuttling data between the STREAMs and SRAM cells, the SRAM bandwidth, M, exceeds the stream bandwidth B. The SRAM bandwidth of MEM slice is given as $$M = 2\ hem \times 44 \frac{\text{slices}}{\text{hem}} \times 2 \frac{\text{banks}}{\text{slice}} \times 320 \frac{\text{bytes}}{\text{cycle}} = 55\ TiB/s \qquad (2)$$

on-chip memory bandwidth, or 27.5 TiB/s of SRAM bandwidth in each MEM hemisphere.

Staggered Instruction Execution

Instructions in the processor 100 are executed by tiles in each functional slice. In some embodiments, instruction buffers are fetched into an ICU and multi-way instruction dispatch to a functional slice. Each tile in the functional slice inspects the instruction stream on the thread with which it is associated, executes the instruction, and passes it to the adjacent (Northern) tile. The tile-by-tile staggered execution transforms a one-dimensional vector into a two-dimensional tensor by staggering data in time.

Figure 8:
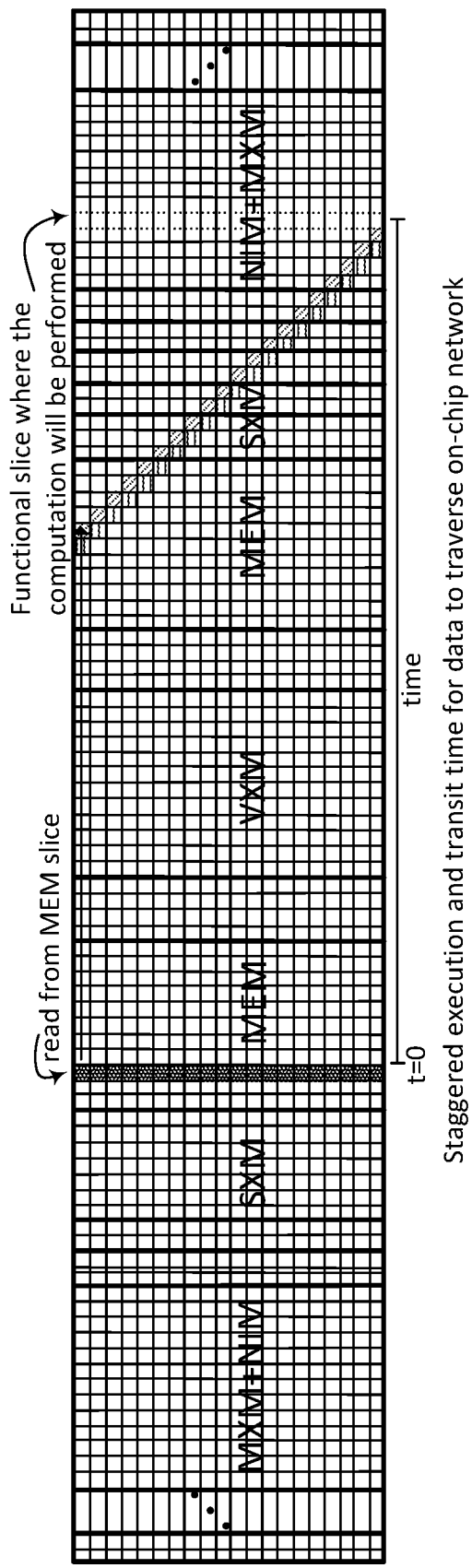
FIG. 8 illustrates an example of how execution of multiple tensors by the processor may be staggered and pipelined, in accordance with some embodiments.

FIG. 8 illustrates an example of how execution of multiple tensors by the processor 100 may be staggered and pipelined, in accordance with some embodiments. As illustrated in FIG. 8, the instruction buffer may be read by the ICU at a time t=0. The instructions are then dispatched to the tiles of the functional slice over a plurality of clock cycles (e.g., one tile per clock cycle, starting from a bottom tile towards a top tile). Therefore, at a later time t=T when the data read from the bottom tile reaches the functional slice where computation is to be performed, the corresponding data from the remaining tiles of the functional slice may not have reached the functional slice yet. For example, the data corresponding to each subsequent tile of the functional slice may be one or more functional slices behind the data of a previous tile.

Method for Operating a Processor

FIG. 9 is a flowchart illustrating a method 900 for operating the processor 100 (e.g., a tensor streaming processor or an artificial intelligence processor), in accordance with some embodiments. The processor 100 can be part of a system that further includes at least one computer processor (e.g., a host server) and a non-transitory computer-readable storage medium for storing computer executable instructions. The method 900 may be performed by a compiler operating on the at least one computer processor. The compiler may utilize as its input a model (e.g., a ML model) for the processor 100 and outputs instructions for configuring operation of the processor 100.

The compiler allocates 910 resources (e.g., functional slices, tiles, data transport lanes, etc.) across an area of the processor 100 for corresponding operations (e.g., arithmetic operations, switching operations, memory operations, etc.) to be performed at a plurality of defined time instants during operation of the processor 100. The compiler schedules 820 each instruction flow (e.g., instruction and control flow 205) of a plurality of instruction flows and one or more corresponding data flows (e.g., data flow(s) 210) to intersect at a specific resource of the allocated resources (e.g., at a specific tile or a specific functional slice) at a defined time instant of the plurality of defined time instants.

In some embodiments, the compiler schedules processing of the one or more data flows by transporting the one or more data flows through the specific resource of the processor. The compiler further schedules transportation of the processed one or more data flows along one or more data transport lanes of the allocated resources in a direction indicated in a corresponding instruction, each data transport lane positioned along a first spatial dimension, wherein the resources further comprising a plurality of functional slices of a module type, each functional slice having a plurality of tiles.

In some embodiments, the processor presented herein includes a plurality of functional slices of a module type (e.g., VXM, MXM, SXM, MEM, ICU, C2C, etc.), each functional slice having a plurality of tiles. The processor further includes a plurality of data transport lanes for transporting data in a direction indicated in a corresponding instruction, each of the plurality of data transport lanes positioned along a first spatial dimension. The processor also includes a plurality of instruction queues, each instruction queue associated with a corresponding functional slice of the plurality of functional slices, wherein the instructions in the instruction queues comprise a functional slice specific operation code.

Additional Considerations

The disclosed configurations may have benefits and advantages that include, for example, a more efficient data flow by separating the functions of the processor into specialized functional units, and configuring the timing of data and instructions to each functional unit, such that each unit is able operate on received data based upon a known timing between received data and instructions. Because the compiler for the processor is hardware aware, it is able to configure an explicit plan for the processor indicating how and when instructions and data operands are transmitted to different tiles of the processor. By accounting for the timing of received instructions and data, the data can be transmitted between the tiles of the processor without unnecessary metadata, increasing an efficiency of the transmission. In addition, by separating the transmission of data and instructions, instructions can be iterated and looped independent of received data operands.

In addition, because each tile of the processor to be dedicated to a specific function (e.g., MEM, VXM, MXM, SXM), the amount of instructions needed to be processed by the tiles may be reduced. For example, certain tiles (e.g., MXM) may be configured to perform a limited set of operations on any received data. As such, these tiles may be able to operate without having to receive explicit instructions or only receiving intermittent or limited instructions, potentially simplifying operation of the processor. For example, data operands read from memory can be intercepted by multiple functional slices as the data is transmitted across a data lane, allowing for multiple operations to be performed on the data in a more efficient manner.

In operation, a host computer programs a DMA engine to actually transfer data, again all of which is coordinated by the runtime layer. Specifically, the ICU transfers 320-byte vectors from PCIe-Gen4 32-bytes every core-clock cycle (e.g., nominal 900 Mhz). Thus, the 320-element vector arrives over a period of 10 cycles and placed on multiple streams moving towards the MEM. The incoming streams flow on S24-31 (upper eight streams), from which the MEM performs a "write" to commit that vector to SRAM. Hence, a PCI-Receive consists of (i) receiving the data from the PCI interface, and (ii) writing the vector into the specified MEM slice.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Some embodiments of the present disclosure may further relate to a system comprising a processor (e.g., a tensor streaming processor or an artificial intelligence processor), at least one computer processor (e.g., a host server), and a non-transitory computer-readable storage medium. The storage medium can store computer executable instructions, which when executed by the compiler operating on the at least one computer processor, cause the at least one computer processor to be operable for performing the operations and techniques described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method performed by a compiler operating on a computer, the method comprising:
allocating a plurality of resources of a processor for a plurality of operations to be executed at a plurality of time instants of the processor; and
scheduling an instruction and data for the instruction to intersect at a resource of the plurality of allocated resources at a time instant of the plurality of time instants to execute at least one of the plurality of operations specified by the instruction.

2. The method of claim 1, further comprising:
scheduling processing of the data by transporting the data through the resource; and
scheduling transportation of the processed data along one or more data transport lanes of the processor in a direction indicated in the instruction,
the plurality of allocated resources comprising a plurality of data transport lanes and a plurality of sets of tiles.

3. The method of claim 1, further comprising:
controlling a dispatch time of the instruction based on a functional delay timing parameter and an instruction-operand skew parameter embedded into the instruction.

4. The method of claim 1, further comprising:
scheduling the instruction and the data to be received at a corresponding resource of the plurality of allocated resources with a predetermined temporal relationship between the instruction and the data.

5. The method of claim 1, further comprising:
scheduling a dispatch of the instruction from a corresponding subset of instruction control units in the processor onto a corresponding resource of the plurality of allocated resources for executing the at least one operation.

6. The method of claim 1, further comprising:
determining when an output produced by the instruction is available at a stream register of the processor, based on a temporal parameter appended to the instruction.

7. The method of claim 1, further comprising:
scheduling transportation of the data and a dispatch of the instruction such that the data and the instruction intersect at a corresponding resource of the plurality of allocated resources at a specific time instant of the processor, based on a temporal parameter appended to the instruction.

8. The method of claim 1, further comprising:
including an operation code into the instruction, the operation code initiating execution of the at least one operation at the resource.

9. The method of claim 1, further comprising:
determining a number of clock cycles for the instruction to produce an output available at a stream register of the processor based on temporal information included into the instruction.

10. The method of claim 1, further comprising:
scheduling the instruction and the data to intersect at the resource at the time instant of the processor based on information in the instruction about a number of clock cycles between a first time instant of a dispatch of the instruction and a second time instant of arrival of the data at the resource.

11. A non-transitory computer-readable storage medium having stored thereon executable instructions, which when executed by a processor cause the processor to:
allocate a plurality of resources of the processor for a plurality of operations to be executed at a plurality of time instants of the processor; and
schedule an instruction and data for the instruction to intersect at a resource of the plurality of allocated resources at a time instant of the plurality of time instants to execute at least one of the plurality of operations specified by the instruction.

12. The non-transitory computer-readable storage medium of claim 11, further comprising instructions that when executed by the processor further cause the processor to:
schedule processing of the data by transporting the data through the resource; and schedule transportation of the processed data along one or more data transport lanes of the processor in a direction indicated in the instruction, the plurality of allocated resources comprising a plurality of data transport lanes and a plurality of sets of tiles.

13. The non-transitory computer-readable storage medium of claim 11, further comprising instructions that when executed by the processor further cause the processor to:

control a dispatch time of the instruction based on a functional delay timing parameter and an instruction-operand skew parameter embedded into the instruction.

14. The non-transitory computer-readable storage medium of claim 11, further comprising instructions that when executed by the processor further cause the processor to:

schedule the instruction and the data to be received at a corresponding resource of the plurality of allocated resources with a predetermined temporal relationship between the instruction and the data.

15. The non-transitory computer-readable storage medium of claim 11, further comprising instructions that when executed by the processor further cause the processor to:

schedule a dispatch of the instruction from a corresponding subset of instruction control units in the processor onto a corresponding resource of the plurality of allocated resources for executing the at least one operation.

16. The non-transitory computer-readable storage medium of claim 11, further comprising instructions that when executed by the processor further cause the processor to:

determine when an output produced by the instruction is available at a stream register of the processor, based on a first temporal parameter appended to the instruction; and schedule transportation of the data and a dispatch of the instruction such that the data and the instruction intersect at a corresponding resource of the plurality of allocated resources at a specific time instant of the processor, based on a temporal parameter appended to the instruction.

17. The non-transitory computer-readable storage medium of claim 11, further comprising instructions that when executed by the processor further cause the processor to:

determine a number of clock cycles for the instruction to produce an output available at a stream register of the processor based on temporal information included into the instruction.

18. The non-transitory computer-readable storage medium of claim 11, further comprising instructions that when executed by the processor further cause the processor to:

schedule the instruction and the data to intersect at the resource at the time instant of the processor based on information in the instruction about a number of clock cycles between a first time instant of a dispatch of the instruction and a second time instant of arrival of the data at the resource.

19. A method performed by a compiler operating on a computer, the method comprising:

scheduling fetching of an instruction by a subset of instruction control units (ICUs) in a processor, the subset of ICUs coupled to a set of tiles in the processor; and scheduling a dispatch of the instruction from the subset of ICUs onto the set of tiles for executing one or more operations specified by the instruction.

20. The method of claim 19, further comprising:

determining when an output produced by the instruction is available at a stream register of the processor, based on a first temporal parameter appended to the instruction; and scheduling one or more operands for the instruction and the dispatch of the instruction such that the one or more operands and the instruction intersect at a tile of the set of tiles at a specific time instant of the processor, based on a second temporal parameter appended to the instruction.

* * * * *